(12) United States Patent
Arandorenko et al.

(10) Patent No.: US 11,449,059 B2
(45) Date of Patent: Sep. 20, 2022

(54) OBSTACLE DETECTION FOR A MOBILE AUTOMATION APPARATUS

(71) Applicant: SYMBOL TECHNOLOGIES, LLC, Lincolnshire, IL (US)

(72) Inventors: Peter Arandorenko, Mississauga (CA); Kevin C. Jen, Markham (CA); Chengzhi W. Liu, Mississauga (CA); Thomas D. Kingsford, Toronto (CA)

(73) Assignee: Symbol Technologies, LLC, Holtsville, NY (US)

( * ) Notice: Subject to any disclaimer, the term of this patent is extended or adjusted under 35 U.S.C. 154(b) by 18 days.

(21) Appl. No.: 15/964,475

(22) Filed: Apr. 27, 2018

(65) Prior Publication Data

US 2018/0314261 A1 Nov. 1, 2018

Related U.S. Application Data

(60) Provisional application No. 62/492,670, filed on May 1, 2017, provisional application No. 62/492,712, filed on May 1, 2017.

(51) Int. Cl.
*G05D 1/02* (2020.01)
*G05D 1/00* (2006.01)

(52) U.S. Cl.
CPC ......... *G05D 1/0214* (2013.01); *G05D 1/0088* (2013.01); *G05D 1/024* (2013.01);
(Continued)

(58) Field of Classification Search
CPC .... G05D 1/0214; G05D 1/0088; G05D 1/024; G05D 1/0246; G05D 1/0255;
(Continued)

(56) References Cited

U.S. PATENT DOCUMENTS

| | | | |
|---|---|---|---|
| 5,209,712 | A | 5/1993 | Ferri |
| 5,214,615 | A | 5/1993 | Bauer |

(Continued)

FOREIGN PATENT DOCUMENTS

| | | |
|---|---|---|
| CA | 2835830 | 11/2012 |
| CA | 3028156 | 1/2018 |

(Continued)

OTHER PUBLICATIONS

"Fair Billing with Automatic Dimensioning" pp. 1-4, undated, Copyright Mettler-Toledo International Inc.
(Continued)

*Primary Examiner* — Navid Ziaeianmehdizadeh

(57) ABSTRACT

Obstacle detection for a mobile automation apparatus is provided. The mobile automation apparatus includes a structured light camera positioned on a support structure to detect at least a top of a shopping cart in a region adjacent to the mobile automation apparatus. The mobile automation apparatus can include other structured light cameras. Furthermore, one or more ultrasound arrays are used as secondary obstacle detector such that when the one or more ultrasound arrays detect an object, and at least one structured light camera simultaneously does not detect the object, an obstacle avoidance protocol is implemented.

20 Claims, 10 Drawing Sheets

(52) U.S. Cl.
CPC ......... *G05D 1/0246* (2013.01); *G05D 1/0255* (2013.01); *G05D 2201/0207* (2013.01); *G05D 2201/0216* (2013.01); *Y10S 901/01* (2013.01); *Y10S 901/47* (2013.01)

(58) Field of Classification Search
CPC .... G05D 2201/0207; G05D 2201/0216; Y10S 901/01; Y10S 901/47
See application file for complete search history.

(56) References Cited

U.S. PATENT DOCUMENTS

| | | |
|---|---|---|
| 5,408,322 A | 4/1995 | Hsu et al. |
| 5,414,268 A | 5/1995 | McGee |
| 5,423,617 A | 6/1995 | Marsh et al. |
| 5,534,762 A | 7/1996 | Kim |
| 5,566,280 A | 10/1996 | Fukui et al. |
| 5,704,049 A | 12/1997 | Briechle |
| 5,953,055 A | 9/1999 | Huang et al. |
| 5,988,862 A | 11/1999 | Kacyra et al. |
| 6,026,376 A | 2/2000 | Kenney |
| 6,034,379 A | 3/2000 | Bunte et al. |
| 6,075,905 A | 6/2000 | Herman et al. |
| 6,115,114 A | 9/2000 | Berg et al. |
| 6,141,293 A | 10/2000 | Amorai-Moriya et al. |
| 6,304,855 B1 | 10/2001 | Burke |
| 6,442,507 B1 | 8/2002 | Skidmore et al. |
| 6,549,825 B2 | 4/2003 | Kurata |
| 6,580,441 B2 | 6/2003 | Schileru-Key |
| 6,711,293 B1 | 3/2004 | Lowe |
| 6,721,723 B1 | 4/2004 | Gibson et al. |
| 6,721,769 B1 | 4/2004 | Rappaport et al. |
| 6,836,567 B1 | 12/2004 | Silver et al. |
| 6,995,762 B1 | 2/2006 | Pavlidis et al. |
| 7,090,135 B2 | 8/2006 | Patel |
| 7,137,207 B2 | 11/2006 | Armstrong et al. |
| 7,245,558 B2 | 7/2007 | Willins et al. |
| 7,248,754 B2 | 7/2007 | Cato |
| 7,277,187 B2 | 10/2007 | Smith et al. |
| 7,373,722 B2 | 5/2008 | Cooper et al. |
| 7,474,389 B2 | 1/2009 | Greenberg et al. |
| 7,487,595 B2 | 2/2009 | Armstrong et al. |
| 7,493,336 B2 | 2/2009 | Noonan |
| 7,508,794 B2 | 3/2009 | Feather et al. |
| 7,527,205 B2 | 5/2009 | Zhu et al. |
| 7,605,817 B2 | 10/2009 | Zhang et al. |
| 7,647,752 B2 | 1/2010 | Magnell |
| 7,693,757 B2 | 4/2010 | Zimmerman |
| 7,726,575 B2 | 6/2010 | Wang et al. |
| 7,751,928 B1 | 7/2010 | Antony et al. |
| 7,783,383 B2 | 8/2010 | Eliuk et al. |
| 7,839,531 B2 | 11/2010 | Sugiyama |
| 7,845,560 B2 | 12/2010 | Emanuel et al. |
| 7,885,865 B2 | 2/2011 | Benson et al. |
| 7,925,114 B2 | 4/2011 | Mai et al. |
| 7,957,998 B2 | 6/2011 | Riley et al. |
| 7,996,179 B2 | 8/2011 | Lee et al. |
| 8,009,864 B2 | 8/2011 | Linaker et al. |
| 8,049,621 B1 | 11/2011 | Egan |
| 8,091,782 B2 | 1/2012 | Cato et al. |
| 8,094,902 B2 | 1/2012 | Crandall et al. |
| 8,094,937 B2 | 1/2012 | Teoh et al. |
| 8,132,728 B2 | 3/2012 | Dwinell et al. |
| 8,134,717 B2 | 3/2012 | Pangrazio et al. |
| 8,189,855 B2 | 5/2012 | Opalach et al. |
| 8,199,977 B2 | 6/2012 | Krishnaswamy et al. |
| 8,207,964 B1 | 6/2012 | Meadow et al. |
| 8,233,055 B2 | 7/2012 | Matsunaga et al. |
| 8,260,742 B2 | 9/2012 | Cognigni et al. |
| 8,265,895 B2 | 9/2012 | Willins et al. |
| 8,277,396 B2 | 10/2012 | Scott et al. |
| 8,284,988 B2 | 10/2012 | Sones et al. |
| 8,423,431 B1 | 4/2013 | Rouaix et al. |
| 8,429,004 B2 | 4/2013 | Hamilton et al. |
| 8,463,079 B2 | 6/2013 | Ackley et al. |
| 8,479,996 B2 | 7/2013 | Barkan et al. |
| 8,520,067 B2 | 8/2013 | Ersue |
| 8,542,252 B2 | 9/2013 | Perez et al. |
| 8,571,314 B2 | 10/2013 | Tao et al. |
| 8,599,303 B2 | 12/2013 | Stettner |
| 8,630,924 B2 | 1/2014 | Groenevelt et al. |
| 8,660,338 B2 | 2/2014 | Ma et al. |
| 8,743,176 B2 | 6/2014 | Stettner et al. |
| 8,757,479 B2 | 6/2014 | Clark et al. |
| 8,812,226 B2 | 8/2014 | Zeng |
| 8,923,893 B2 | 12/2014 | Austin et al. |
| 8,939,369 B2 | 1/2015 | Olmstead et al. |
| 8,954,188 B2 | 2/2015 | Sullivan et al. |
| 8,958,911 B2 | 2/2015 | Wong et al. |
| 8,971,637 B1 | 3/2015 | Rivard |
| 8,989,342 B2 | 3/2015 | Liesenfelt et al. |
| 9,007,601 B2 | 4/2015 | Steffey et al. |
| 9,037,287 B1 | 5/2015 | Grauberger et al. |
| 9,064,394 B1 | 6/2015 | Trundle |
| 9,070,285 B1 | 6/2015 | Ramu et al. |
| 9,072,929 B1 | 7/2015 | Rush et al. |
| 9,120,622 B1 | 9/2015 | Elazary et al. |
| 9,129,277 B2 | 9/2015 | Macintosh |
| 9,135,491 B2 | 9/2015 | Morandi et al. |
| 9,159,047 B2 | 10/2015 | Winkel |
| 9,171,442 B2 | 10/2015 | Clements |
| 9,247,211 B2 | 1/2016 | Zhang et al. |
| 9,329,269 B2 | 5/2016 | Zeng |
| 9,349,076 B1 | 5/2016 | Liu et al. |
| 9,367,831 B1 | 6/2016 | Besehanic |
| 9,380,222 B2 | 6/2016 | Clayton et al. |
| 9,396,554 B2 | 7/2016 | Williams et al. |
| 9,400,170 B2 | 7/2016 | Steffey |
| 9,424,482 B2 | 8/2016 | Patel et al. |
| 9,517,767 B1 | 12/2016 | Kentley et al. |
| 9,542,746 B2 | 1/2017 | Wu et al. |
| 9,549,125 B1 | 1/2017 | Goyal et al. |
| 9,562,971 B2 | 2/2017 | Shenkar et al. |
| 9,565,400 B1 | 2/2017 | Curlander et al. |
| 9,589,353 B2 | 3/2017 | Mueller-Fischer et al. |
| 9,600,731 B2 | 3/2017 | Yasunaga et al. |
| 9,600,892 B2 | 3/2017 | Patel et al. |
| 9,612,123 B1 * | 4/2017 | Levinson ............... B60Q 1/525 |
| 9,639,935 B1 | 5/2017 | Douady-Pleven et al. |
| 9,697,429 B2 | 7/2017 | Patel et al. |
| 9,766,074 B2 | 9/2017 | Roumeliotis et al. |
| 9,778,388 B1 | 10/2017 | Connor |
| 9,779,205 B2 | 10/2017 | Namir |
| 9,791,862 B1 | 10/2017 | Connor |
| 9,805,240 B1 | 10/2017 | Zheng et al. |
| 9,811,754 B2 | 11/2017 | Schwartz |
| 9,827,683 B1 | 11/2017 | Hance et al. |
| 9,880,009 B2 | 1/2018 | Bell |
| 9,928,708 B2 | 3/2018 | Lin et al. |
| 9,953,420 B2 | 4/2018 | Wolski et al. |
| 9,980,009 B2 | 5/2018 | Jiang et al. |
| 9,994,339 B2 | 6/2018 | Colson et al. |
| 9,996,818 B1 | 6/2018 | Ren et al. |
| 10,019,803 B2 | 7/2018 | Venable et al. |
| 10,111,646 B2 | 10/2018 | Nycz et al. |
| 10,121,072 B1 | 11/2018 | Kekatpure |
| 10,127,438 B1 | 11/2018 | Fisher et al. |
| 10,133,951 B1 | 11/2018 | Mendonca et al. |
| 10,197,400 B2 | 2/2019 | Jesudason et al. |
| 10,210,603 B2 | 2/2019 | Venable et al. |
| 10,229,386 B2 | 3/2019 | Thomas |
| 10,248,653 B2 | 4/2019 | Blassin et al. |
| 10,262,294 B1 | 4/2019 | Hahn et al. |
| 10,265,871 B2 | 4/2019 | Hance et al. |
| 10,289,990 B2 | 5/2019 | Rizzolo et al. |
| 10,336,543 B1 | 7/2019 | Sills et al. |
| 10,349,031 B2 | 7/2019 | DeLuca |
| 10,352,689 B2 | 7/2019 | Brown et al. |
| 10,373,116 B2 | 8/2019 | Medina et al. |
| 10,394,244 B2 | 8/2019 | Song et al. |
| 2001/0031069 A1 | 10/2001 | Kondo et al. |
| 2001/0041948 A1 | 11/2001 | Ross et al. |
| 2002/0006231 A1 | 1/2002 | Jayant et al. |
| 2002/0059202 A1 | 5/2002 | Hadzikadic et al. |

(56) References Cited

U.S. PATENT DOCUMENTS

| | | |
|---|---|---|
| 2002/0097439 A1 | 7/2002 | Braica |
| 2002/0146170 A1 | 10/2002 | Rom |
| 2002/0158453 A1 | 10/2002 | Levine |
| 2002/0164236 A1 | 11/2002 | Fukuhara et al. |
| 2003/0003925 A1 | 1/2003 | Suzuki |
| 2003/0094494 A1 | 5/2003 | Blanford et al. |
| 2003/0174891 A1 | 9/2003 | Wenzel et al. |
| 2004/0021313 A1 | 2/2004 | Gardner et al. |
| 2004/0084527 A1 | 5/2004 | Bong et al. |
| 2004/0131278 A1 | 7/2004 | Imagawa et al. |
| 2004/0240754 A1 | 12/2004 | Smith et al. |
| 2005/0016004 A1 | 1/2005 | Armstrong et al. |
| 2005/0114059 A1 | 5/2005 | Chang et al. |
| 2005/0174351 A1 | 8/2005 | Chang |
| 2005/0213082 A1 | 9/2005 | DiBernardo et al. |
| 2005/0213109 A1 | 9/2005 | Schell et al. |
| 2006/0032915 A1 | 2/2006 | Schwartz |
| 2006/0045325 A1 | 3/2006 | Zavadsky et al. |
| 2006/0064286 A1 | 3/2006 | Fink et al. |
| 2006/0106742 A1 | 5/2006 | Bochicchio et al. |
| 2006/0279527 A1 | 12/2006 | Zehner et al. |
| 2006/0285486 A1 | 12/2006 | Roberts et al. |
| 2007/0036398 A1 | 2/2007 | Chen |
| 2007/0074410 A1 | 4/2007 | Armstrong et al. |
| 2007/0272732 A1 | 11/2007 | Hindmon |
| 2008/0002866 A1 | 1/2008 | Fujiwara |
| 2008/0025565 A1 | 1/2008 | Zhang et al. |
| 2008/0027591 A1* | 1/2008 | Lenser ............... G05D 1/0251 701/2 |
| 2008/0077511 A1* | 3/2008 | Zimmerman ......... G06Q 10/00 705/28 |
| 2008/0159634 A1 | 7/2008 | Sharma et al. |
| 2008/0164310 A1 | 7/2008 | Dupuy et al. |
| 2008/0175513 A1 | 7/2008 | Lai et al. |
| 2008/0181529 A1 | 7/2008 | Michel et al. |
| 2008/0183730 A1 | 7/2008 | Enga |
| 2008/0238919 A1 | 10/2008 | Pack |
| 2008/0294487 A1 | 11/2008 | Nasser |
| 2009/0009123 A1 | 1/2009 | Skaff |
| 2009/0024353 A1 | 1/2009 | Lee et al. |
| 2009/0057411 A1 | 3/2009 | Madej et al. |
| 2009/0059270 A1 | 3/2009 | Opalach et al. |
| 2009/0060349 A1 | 3/2009 | Linaker et al. |
| 2009/0063306 A1 | 3/2009 | Fano et al. |
| 2009/0063307 A1 | 3/2009 | Groenovelt et al. |
| 2009/0074303 A1 | 3/2009 | Filimonova et al. |
| 2009/0088975 A1 | 4/2009 | Sato et al. |
| 2009/0103773 A1 | 4/2009 | Wheeler et al. |
| 2009/0125350 A1 | 5/2009 | Lessing et al. |
| 2009/0125535 A1 | 5/2009 | Basso et al. |
| 2009/0152391 A1 | 6/2009 | McWhirk |
| 2009/0160975 A1 | 6/2009 | Kwan |
| 2009/0192921 A1 | 7/2009 | Hicks |
| 2009/0206161 A1 | 8/2009 | Olmstead |
| 2009/0236155 A1 | 9/2009 | Skaff |
| 2009/0252437 A1 | 10/2009 | Li et al. |
| 2009/0287587 A1 | 11/2009 | Bloebaum et al. |
| 2009/0323121 A1 | 12/2009 | Valkenburg et al. |
| 2010/0017407 A1 | 1/2010 | Beniyama et al. |
| 2010/0026804 A1 | 2/2010 | Tanizaki et al. |
| 2010/0066587 A1* | 3/2010 | Yamauchi ............ G01S 13/867 342/70 |
| 2010/0070365 A1 | 3/2010 | Siotia et al. |
| 2010/0082194 A1 | 4/2010 | Yabushita et al. |
| 2010/0091094 A1 | 4/2010 | Sekowski |
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0161569 A1 | 6/2010 | Schreter |
| 2010/0171826 A1 | 7/2010 | Hamilton et al. |
| 2010/0208039 A1 | 8/2010 | Setettner |
| 2010/0214873 A1 | 8/2010 | Somasundaram et al. |
| 2010/0235033 A1 | 9/2010 | Yamamoto et al. |
| 2010/0241289 A1* | 9/2010 | Sandberg ............ B25J 9/1689 701/2 |
| 2010/0257149 A1 | 10/2010 | Cognigni et al. |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0188759 A1 | 8/2011 | Filimonova et al. |
| 2011/0216063 A1 | 9/2011 | Hayes |
| 2011/0242286 A1 | 10/2011 | Pace et al. |
| 2011/0246503 A1 | 10/2011 | Bender et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0017028 A1 | 1/2012 | Tsirkin |
| 2012/0019393 A1 | 1/2012 | Wolinsky et al. |
| 2012/0022913 A1 | 1/2012 | VolKmann et al. |
| 2012/0051730 A1 | 3/2012 | Cote et al. |
| 2012/0069051 A1 | 3/2012 | Hagbi et al. |
| 2012/0075342 A1 | 3/2012 | Choubassi et al. |
| 2012/0133639 A1 | 5/2012 | Kopf et al. |
| 2012/0307108 A1 | 6/2012 | Forutanpour |
| 2012/0169530 A1 | 7/2012 | Padmanabhan et al. |
| 2012/0179621 A1 | 7/2012 | Moir et al. |
| 2012/0185112 A1 | 7/2012 | Sung et al. |
| 2012/0194644 A1 | 8/2012 | Newcombe et al. |
| 2012/0197464 A1 | 8/2012 | Wang et al. |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0287249 A1 | 11/2012 | Choo et al. |
| 2012/0323620 A1 | 12/2012 | Hofman et al. |
| 2013/0030700 A1 | 1/2013 | Miller et al. |
| 2013/0076586 A1 | 3/2013 | Karhuketo et al. |
| 2013/0090881 A1 | 4/2013 | Janardhanan et al. |
| 2013/0119138 A1 | 5/2013 | Winkel |
| 2013/0132913 A1 | 5/2013 | Fu et al. |
| 2013/0134178 A1 | 5/2013 | Lu |
| 2013/0138246 A1 | 5/2013 | Gutmann et al. |
| 2013/0138534 A1 | 5/2013 | Herwig |
| 2013/0142421 A1 | 6/2013 | Silver et al. |
| 2013/0144565 A1 | 6/2013 | Miller |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0169681 A1 | 7/2013 | Rasane et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0226344 A1 | 8/2013 | Wong et al. |
| 2013/0228620 A1 | 9/2013 | Ahem et al. |
| 2013/0232039 A1 | 9/2013 | Jackson et al. |
| 2013/0235165 A1 | 9/2013 | Gharib et al. |
| 2013/0235206 A1 | 9/2013 | Smith et al. |
| 2013/0236089 A1 | 9/2013 | Litvak et al. |
| 2013/0278631 A1 | 10/2013 | Border et al. |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2013/0342363 A1 | 12/2013 | Paek et al. |
| 2014/0002597 A1 | 1/2014 | Taguchi et al. |
| 2014/0003655 A1 | 1/2014 | Gopalkrishnan et al. |
| 2014/0003727 A1 | 1/2014 | Lortz et al. |
| 2014/0006229 A1 | 1/2014 | Birch et al. |
| 2014/0016832 A1 | 1/2014 | Kong et al. |
| 2014/0019311 A1 | 1/2014 | Tanaka |
| 2014/0025201 A1 | 1/2014 | Ryu et al. |
| 2014/0028837 A1 | 1/2014 | Gao et al. |

(56) References Cited

U.S. PATENT DOCUMENTS

| | | |
|---|---|---|
| 2014/0047342 A1 | 2/2014 | Breternitz et al. |
| 2014/0049616 A1 | 2/2014 | Stettner |
| 2014/0052555 A1 | 2/2014 | MacIntosh |
| 2014/0086483 A1 | 3/2014 | Zhang et al. |
| 2014/0098094 A1 | 4/2014 | Neumann et al. |
| 2014/0100813 A1 | 4/2014 | Shaowering |
| 2014/0104413 A1 | 4/2014 | McCloskey et al. |
| 2014/0112537 A1 | 4/2014 | Frank et al. |
| 2014/0129027 A1 | 5/2014 | Schnittman |
| 2014/0156133 A1 | 6/2014 | Cullinane et al. |
| 2014/0161359 A1 | 6/2014 | Magri et al. |
| 2014/0192050 A1 | 7/2014 | Qiu et al. |
| 2014/0195095 A1 | 7/2014 | Flohr et al. |
| 2014/0195374 A1 | 7/2014 | Bassemir et al. |
| 2014/0214547 A1 | 7/2014 | Signorelli et al. |
| 2014/0214600 A1 | 7/2014 | Argue et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0279294 A1 | 9/2014 | Field-Darragh et al. |
| 2014/0300637 A1 | 10/2014 | Fan et al. |
| 2014/0316875 A1 | 10/2014 | Tkachenko et al. |
| 2014/0330835 A1 | 11/2014 | Boyer |
| 2014/0344401 A1 | 11/2014 | Varney et al. |
| 2014/0351073 A1 | 11/2014 | Murphy et al. |
| 2014/0369607 A1 | 12/2014 | Patel et al. |
| 2015/0015602 A1 | 1/2015 | Beaudoin |
| 2015/0019391 A1 | 1/2015 | Kumar et al. |
| 2015/0029339 A1 | 1/2015 | Kobres et al. |
| 2015/0032304 A1 | 1/2015 | Nakamura et al. |
| 2015/0039458 A1 | 2/2015 | Reid |
| 2015/0052029 A1 | 2/2015 | Wu et al. |
| 2015/0088618 A1 | 3/2015 | Basir et al. |
| 2015/0088701 A1 | 3/2015 | Desmarais et al. |
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1 | 4/2015 | Patel et al. |
| 2015/0139010 A1 | 5/2015 | Jeong et al. |
| 2015/0154467 A1 | 6/2015 | Feng et al. |
| 2015/0161793 A1 | 6/2015 | Takahashi |
| 2015/0170256 A1 | 6/2015 | Pettyjohn et al. |
| 2015/0181198 A1 | 6/2015 | Baele et al. |
| 2015/0212521 A1* | 7/2015 | Pack .................. G05D 1/0274 701/28 |
| 2015/0235157 A1 | 8/2015 | Avegliano et al. |
| 2015/0245358 A1 | 8/2015 | Schmidt |
| 2015/0262116 A1 | 9/2015 | Katircioglu et al. |
| 2015/0279035 A1 | 10/2015 | Wolski et al. |
| 2015/0298317 A1 | 10/2015 | Wang et al. |
| 2015/0310601 A1 | 10/2015 | Rodriguez et al. |
| 2015/0332368 A1 | 11/2015 | Vartiainen et al. |
| 2015/0352721 A1 | 12/2015 | Wicks et al. |
| 2015/0353280 A1 | 12/2015 | Brazeau et al. |
| 2015/0355639 A1 | 12/2015 | Versteeg et al. |
| 2015/0363625 A1 | 12/2015 | Wu et al. |
| 2015/0363758 A1* | 12/2015 | Wu ..................... G06Q 20/201 705/20 |
| 2015/0365660 A1 | 12/2015 | Wu et al. |
| 2015/0379704 A1 | 12/2015 | Chandrasekar et al. |
| 2016/0026253 A1 | 1/2016 | Bradski et al. |
| 2016/0042223 A1 | 2/2016 | Suh et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0012588 A1 | 4/2016 | Taguchi et al. |
| 2016/0104041 A1 | 4/2016 | Bowers et al. |
| 2016/0107690 A1 | 4/2016 | Oyama et al. |
| 2016/0112628 A1 | 4/2016 | Super et al. |
| 2016/0114488 A1* | 4/2016 | Mascorro Medina .................. B25J 9/1697 700/259 |
| 2016/0129592 A1* | 5/2016 | Saboo .................. G06Q 50/28 700/248 |
| 2016/0132815 A1 | 5/2016 | Itoko et al. |
| 2016/0150217 A1 | 5/2016 | Popov |
| 2016/0156898 A1 | 6/2016 | Ren et al. |
| 2016/0163067 A1 | 6/2016 | Williams et al. |
| 2016/0171336 A1 | 6/2016 | Schwartz |
| 2016/0171429 A1 | 6/2016 | Schwartz |
| 2016/0171707 A1 | 6/2016 | Schwartz |
| 2016/0185347 A1 | 6/2016 | Lefevre et al. |
| 2016/0191759 A1 | 6/2016 | Somanath et al. |
| 2016/0221549 A1* | 8/2016 | Tanase .................. B60T 8/172 |
| 2016/0224927 A1 | 8/2016 | Pettersson |
| 2016/0253735 A1 | 9/2016 | Scudillo et al. |
| 2016/0253844 A1 | 9/2016 | Petrovskaya et al. |
| 2016/0259329 A1 | 9/2016 | High et al. |
| 2016/0260051 A1 | 9/2016 | Wu et al. |
| 2016/0260054 A1 | 9/2016 | High et al. |
| 2016/0271795 A1 | 9/2016 | Vicenti |
| 2016/0313133 A1 | 10/2016 | Zeng et al. |
| 2016/0328618 A1 | 11/2016 | Patel et al. |
| 2016/0328767 A1 | 11/2016 | Bonner et al. |
| 2016/0353099 A1 | 12/2016 | Thomson et al. |
| 2016/0364634 A1 | 12/2016 | Davis et al. |
| 2017/0004649 A1 | 1/2017 | Collet Romea et al. |
| 2017/0011281 A1 | 1/2017 | Dijkman et al. |
| 2017/0011308 A1 | 1/2017 | Sun et al. |
| 2017/0032311 A1 | 2/2017 | Rizzolo et al. |
| 2017/0041553 A1 | 2/2017 | Cao et al. |
| 2017/0054965 A1 | 2/2017 | Raab et al. |
| 2017/0066459 A1 | 3/2017 | Singh |
| 2017/0074659 A1 | 3/2017 | Giurgiu et al. |
| 2017/0083774 A1 | 3/2017 | Solar et al. |
| 2017/0109940 A1 | 4/2017 | Guo et al. |
| 2017/0147966 A1 | 5/2017 | Aversa et al. |
| 2017/0150129 A1 | 5/2017 | Pangrazio |
| 2017/0178060 A1 | 6/2017 | Schwartz |
| 2017/0178227 A1 | 6/2017 | Gornish |
| 2017/0178310 A1 | 6/2017 | Gornish |
| 2017/0193434 A1 | 7/2017 | Shah et al. |
| 2017/0219338 A1 | 8/2017 | Brown et al. |
| 2017/0219353 A1 | 8/2017 | Alesiani |
| 2017/0227645 A1 | 8/2017 | Swope et al. |
| 2017/0227647 A1 | 8/2017 | Baik |
| 2017/0228885 A1 | 8/2017 | Baumgartner |
| 2017/0261993 A1 | 9/2017 | Venable et al. |
| 2017/0262724 A1 | 9/2017 | Wu et al. |
| 2017/0280125 A1 | 9/2017 | Brown et al. |
| 2017/0286773 A1 | 10/2017 | Skaff et al. |
| 2017/0286901 A1 | 10/2017 | Skaff et al. |
| 2017/0297478 A1 | 10/2017 | Sherman et al. |
| 2017/0323253 A1 | 11/2017 | Enssle et al. |
| 2017/0323376 A1 | 11/2017 | Glaser et al. |
| 2017/0337508 A1 | 11/2017 | Bogolea et al. |
| 2018/0001481 A1 | 1/2018 | Shah et al. |
| 2018/0005035 A1 | 1/2018 | Bogolea et al. |
| 2018/0005176 A1 | 1/2018 | Williams et al. |
| 2018/0020145 A1 | 1/2018 | Kotfis et al. |
| 2018/0051991 A1 | 2/2018 | Hong |
| 2018/0053091 A1 | 2/2018 | Savvides et al. |
| 2018/0053305 A1 | 2/2018 | Gu et al. |
| 2018/0075403 A1 | 3/2018 | Mascorro Medina et al. |
| 2018/0089613 A1 | 3/2018 | Chen et al. |
| 2018/0101813 A1 | 4/2018 | Paat et al. |
| 2018/0108120 A1 | 4/2018 | Venable et al. |
| 2018/0108134 A1 | 4/2018 | Venable et al. |
| 2018/0114183 A1 | 4/2018 | Howell |
| 2018/0129201 A1 | 5/2018 | Douglas et al. |
| 2018/0130011 A1 | 5/2018 | Jacobsson |
| 2018/0143003 A1 | 5/2018 | Clayton et al. |
| 2018/0174325 A1 | 6/2018 | Fu et al. |
| 2018/0190160 A1 | 7/2018 | Bryan et al. |
| 2018/0197139 A1 | 7/2018 | Hill |
| 2018/0201423 A1 | 7/2018 | Drzewiecki et al. |
| 2018/0204111 A1 | 7/2018 | Zadeh et al. |
| 2018/0218218 A1 | 8/2018 | Madan et al. |
| 2018/0251253 A1 | 9/2018 | Taira et al. |
| 2018/0276596 A1 | 9/2018 | Murthy et al. |
| 2018/0281191 A1 | 10/2018 | Sinyayskiy et al. |

(56) References Cited

U.S. PATENT DOCUMENTS

| | | |
|---|---|---|
| 2018/0293442 A1 | 10/2018 | Fridental et al. |
| 2018/0293543 A1 | 10/2018 | Tiwari |
| 2018/0306958 A1 | 10/2018 | Goss et al. |
| 2018/0313956 A1 | 11/2018 | Rzeszutek et al. |
| 2018/0314260 A1 | 11/2018 | Jen et al. |
| 2018/0314908 A1 | 11/2018 | Lam |
| 2018/0315007 A1 | 11/2018 | Kingsford et al. |
| 2018/0315065 A1 | 11/2018 | Zhang et al. |
| 2018/0315173 A1 | 11/2018 | Phan et al. |
| 2018/0315865 A1 | 11/2018 | Haist et al. |
| 2018/0321692 A1 | 11/2018 | Castillo-Effen et al. |
| 2018/0370727 A1 | 12/2018 | Hance et al. |
| 2019/0049962 A1 | 2/2019 | Ouellette et al. |
| 2019/0057588 A1 | 2/2019 | Savvides et al. |
| 2019/0065861 A1 | 2/2019 | Savvides et al. |
| 2019/0073554 A1 | 3/2019 | Rzeszutek |
| 2019/0073559 A1 | 3/2019 | Rzeszutek et al. |
| 2019/0073627 A1 | 3/2019 | Nakdimon et al. |
| 2019/0077015 A1 | 3/2019 | Shibasaki et al. |
| 2019/0087663 A1 | 3/2019 | Yamazaki et al. |
| 2019/0094876 A1 | 3/2019 | Moore et al. |
| 2019/0108606 A1 | 4/2019 | Komiyama |
| 2019/0160675 A1 | 5/2019 | Paschall, II et al. |
| 2019/0178436 A1 | 6/2019 | Mao et al. |
| 2019/0180150 A1 | 6/2019 | Taylor et al. |
| 2019/0197439 A1 | 6/2019 | Wang |
| 2019/0197728 A1 | 6/2019 | Yamao |
| 2019/0236530 A1 | 8/2019 | Cantrell et al. |
| 2019/0271984 A1 | 9/2019 | Kingsford |
| 2019/0304132 A1 | 10/2019 | Yoda et al. |
| 2019/0392212 A1 | 12/2019 | Sawhney et al. |
| 2020/0053325 A1 | 2/2020 | Deyle et al. |
| 2020/0314333 A1 | 10/2020 | Liang et al. |

FOREIGN PATENT DOCUMENTS

| | | |
|---|---|---|
| CN | 102214343 | 10/2011 |
| CN | 104200086 | 12/2014 |
| CN | 105989512 | 10/2016 |
| CN | 107067382 | 8/2017 |
| CN | 206952978 | 2/2018 |
| EP | 766098 | 4/1997 |
| EP | 1311993 | 5/2007 |
| EP | 2309378 | 4/2011 |
| EP | 2439487 | 4/2012 |
| EP | 2472475 | 7/2012 |
| EP | 2562688 | 2/2013 |
| EP | 2662831 | 11/2013 |
| EP | 2693362 | 2/2014 |
| EP | 3400113 | 11/2018 |
| FR | 3001567 | 8/2014 |
| GB | 2323238 | 9/1998 |
| GB | 2330265 | 4/1999 |
| JP | 2014170431 | 9/2014 |
| JP | 2016194834 | 11/2016 |
| JP | 2017016539 | 1/2017 |
| KR | 101234798 | 1/2009 |
| KR | 1020190031431 | 3/2019 |
| WO | WO 99/23600 | 5/1999 |
| WO | WO 2003002935 | 1/2003 |
| WO | WO 2003025805 | 3/2003 |
| WO | WO 2006136958 | 12/2006 |
| WO | WO 2007042251 | 4/2007 |
| WO | WO 2008057504 | 5/2008 |
| WO | WO 2008154611 | 12/2008 |
| WO | WO 2012103199 | 8/2012 |
| WO | WO 2012103202 | 8/2012 |
| WO | WO 2012154801 | 11/2012 |
| WO | WO 2013165674 | 11/2013 |
| WO | WO 2014066422 | 5/2014 |
| WO | WO 2014092552 | 6/2014 |
| WO | WO 2014181323 | 11/2014 |
| WO | WO 2015127503 | 9/2015 |
| WO | WO 2016020038 | 2/2016 |
| WO | WO 2017175312 | 10/2017 |
| WO | WO 2017187106 | 11/2017 |
| WO | WO 2018018007 | 1/2018 |
| WO | WO 2018204308 | 11/2018 |
| WO | WO 2018204342 | 11/2018 |
| WO | WO 2019023249 | 1/2019 |

OTHER PUBLICATIONS

"Plane Detection in Point Cloud Data" dated Jan. 25, 2010 by Michael Ying Yang and Wolfgang Forstner, Technical Report 1, 2010, University of Bonn.

"Swift Dimension" Trademark Omniplanar, Copyright 2014.

Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.

Batalin et al., "Mobile robot navigation using a sensor network," IEEE, International Conference on robotics and automation, Apr. 26, May 1, 2004, pp. 636-641.

Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.

Biswas et al. "Depth Camera Based Indoor Mobile Robot Localization and Navigation" Robotics and Automation (ICRA), 2012 IEEE International Conference on IEEE, 2012.

Bohm, Multi-Image Fusion for Occlusion-Free Façade Texturing, International Archives of the Photogrammetry, Remote Sensing and Spatial Information Sciences, pp. 867-872 (Jan. 2004).

Bristow et al., "A Survey of Iterative Learning Control", IEEE Control Systems, Jun. 2006, pp. 96-114.

Buenaposada et al. "Realtime tracking and estimation of plane pose" Proceedings of the ICPR (Aug. 2002) vol. II, IEEE pp. 697-700.

Carreira et al., "Enhanced PCA-based localization using depth maps with missing data," IEEE, pp. 1-8, Apr. 24, 2013.

Notice of allowance for U.S. Appl. No. 14/068,495 dated Apr. 25, 2016.

Notice of allowance for U.S. Appl. No. 14/518,091 dated Apr. 12, 2017.

Notice of allowance for U.S. Appl. No. 15/211,103 dated Apr. 5, 2017.

Olson, Clark F., etal. "Wide-Baseline Stereo Vision for terrain Mapping" in Machine Vision and Applications, Aug. 2010.

Oriolo et al., "An iterative learning controller for nonholonomic mobile Robots", the international Journal of Robotics Research, Aug. 1997, pp. 954-970.

Ostafew et al., "Visual Teach and Repeat, Repeat, Repeat: Iterative learning control to improve mobile robot path tracking in challenging outdoor environment", IEEE/RSJ International Conference on Intelligent robots and Systems, Nov. 2013, p. 176-181.

Park et al., "Autonomous mobile robot navigation using passive rfid in indoor environment," IEEE, Transactions on industrial electronics, vol. 56, issue 7, pp. 2366-2373 (Jul. 2009).

Perveen et al. (An overview of template matching methodologies and its application, International Journal of Research in Computer and Communication Technology, v2n10, Oct. 2013) (Year: 2013).

Pivtoraiko et al., "Differentially constrained mobile robot motion planning in state lattices", journal of field robotics, vol. 26, No. 3, 2009, pp. 308-333.

Pratt W K Ed: "Digital Image processing, 10-image enhancement, 17-image segmentation", Jan. 1, 2001, Digital Image Processing: PIKS Inside, New York: John Wily & Sons, US, pp. 243-258, 551.

Puwein, J., et al."Robust Multi-view camera calibration for wide-baseline camera networks" in IEEE Workshop on Applications of computer vision (WACV), Jan. 2011.

Rusu, et al. "How to incrementally register pairs of clouds," PCL Library, retrieved from internet on Aug. 22, 2016 [http://pointclouds.org/documentation/tutorials/pairwise_incremental_registration.php.

(56) References Cited

OTHER PUBLICATIONS

Rusu, et al. "Spatial Change detection on unorganized point cloud data," PCL Library, retrieved from internet on Aug. 19, 2016 [http://pointclouds.org/documentation/tutorials/octree_change.php].

Schnabel et al. "Efficient RANSAC for Point-Cloud Shape Detection", vol. 0, No. 0, pp. 1-12 (1981).

Senthilkumaran, et al., "Edge Detection Techniques for Image Segmentation—A Survey of Soft Computing Approaches", International Journal of Recent Trends in Engineering, vol. 1, No. 2 (May 2009).

Szeliski, "Modified Hough Transform", Computer Vision. Copyright 2011, pp. 251-254. Retrieved on Aug. 17, 2017 [http://szeliski.org/book/drafts/SzeliskiBook_20100903_draft.pdf].

Tahir, Rabbani, et al., "Segmentation of point clouds using smoothness constraint,"International Archives of Photogrammetry, Remote Sensing and Spatial Information Sciences 36.5 (Sep. 2006): 248-253.

Trevor et al., "Tables, Counters, and Shelves: Semantic Mapping of Surfaces in 3D," Retrieved from Internet Jul. 3, 2018 @ http://citeseerx.ist.psu.edu/viewdoc/download?doi=10.1.1.703.5365&rep=rep1&type=p.

Tseng, et al., "A Cloud Removal Approach for Aerial Image Visualization", International Journal of Innovative Computing, Information & Control, vol. 9, No. 6, pp. 2421-2440 (Jun. 2013).

Uchiyama, et al., "Removal of Moving Objects from a Street-View Image by Fusing Multiple Image Sequences", Pattern Recognition, 2010, 20th International Conference On, IEEE, Piscataway, NJ pp. 3456-3459 (Aug. 23, 2010).

United Kingdom Intellectual Property Office, "Combined Search and Examination Report" for GB Patent Application No. 1813580.6 dated Feb. 21, 2019.

United Kingdom Intellectual Property Office, Combined Search and Examination Report dated Jan. 22, 2016 for GB Patent Application No. 1417218.3.

United Kingdom Intellectual Property Office, Combined Search and Examination Report dated Jan. 22, 2016 for GB Patent Application No. 1521272.3.

United Kingdom Intellectual Property Office, Combined Search and Examination Report dated Mar. 11, 2015 for GB Patent Application No. 1417218.3.

United Kingdom Intellectual Property Office, Combined Search and Examination Report dated May 13, 2020 for GB Patent Application No. 1917864.9.

Varol Gul et al.: "Product placement detection based on image processing", 2014 22nd Signal Processing and Communication Applications Conference (Siu), IEEE, Apr. 23, 2014.

Varol Gul et al.: "Toward Retail product recognition on Grocery shelves", Visual Communications and image processing; Jan. 20, 2004; San Jose, (Mar. 4, 2015).

Weber et al., "Methods for Feature Detection in Point clouds," visualization of large and unstructured data sets—IRTG Workshop, pp. 90-99 (2010).

Zhao Zhou et al.: "An Image contrast Enhancement Algorithm Using PLIP-based histogram Modification", 2017 3rd IEEE International Conference on Cybernetics (Cybcon), IEEE, (Jan. 21, 2017).

Ziang Xie et al., "Multimodal Blending for High-Accuracy Instance Recognition", 2013 IEEE RSJ International Conference on Intelligent Robots and Systems, p. 2214-2221.

Fan Zhang et al., "Parallax-tolerant Image Stitching", 2014 Computer Vision Foundation, pp. 4321-4328.

Kaimo Lin et al., "SEAGULL: Seam-guided Local Alignment for Parallax-tolerant Image Stitching", Retrieved on Nov. 16, 2020 [http://publish.illinois.edu/visual-modeling-and-analytics/files/2016/08/Seagull.pdf].

Julio Zaragoza et al., "As-Projective-As-Possible Image Stitching with Moving DLT", 2013 Computer Vision Foundation, pp. 2339-2346.

Zeng et al., Multi-view Self Supervised Deep Learning for 6D Pose Estimation in the Amazon Picking Challenge, May 7, 2017. Retrieved on Nov. 16, 2019 [https://arxiv.org/pdf/1609.09475.pdf].

Zhang et al., "Mobile computing and industrial augmented reality for real-time data access", Emerging Technologies and Factory Automation, 2001, 8th IEEE International Conference on Oct. 15-18, 2001, pp. 583-588, vol. 2.

Castorena et al., "Autocalibration of lidar and optical cameras via edge alignment", 2016 IEEE International Conference on Acoustics, Speech and Signal Processing (Mar. 20, 2016).

Chen et al. "Improving Octree-Based Occupancy Maps Using Environment Sparsity with Application to Aerial Robot Navigation" Robotics and Automation (ICRA), 2017 IEEE International Conference on IEEE, pp. 3656-3663, 2017.

Cleveland Jonas et al.: "Automated System for Semantic Object Labeling with Soft-Object Recognition and Dynamic Programming Segmentation", IEEE Transactions on Automation Science and Engineering, IEEE Service Center, New York, NY (Apr. 1, 2017).

Cook et al., "Distributed Ray Tracing" ACM SIGGRAPH Computer Graphics, vol. 18, No. 3, ACM pp. 137-145, 1984.

Datta, A., et al. "Accurate camera calibration using iterative refinement of control points," in Computer Vision Workshops (ICCV Workshops), 2009.

Deschaud, et al., "A Fast and Accurate Place Detection algoritm for large noisy point clouds using filtered normals and voxel growing," 3DPVT, May 2010, Paris, France.

Douillard, Bertrand, et al. "On the segmentation of 3D LIDAR point clouds." Robotics and Automation (ICRA), 2011 IEEE International Conference on IEEE, 2011.

Dubois, M., et al., "A comparison of geometric and energy-based point cloud semantic segmentation methods," European Conference on Mobile Robots (ECMR), p. 88-93, Sep. 25-27, 2013.

Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).

F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176- p. 178.

Federico Tombari et al. "Multimodal cue integration through Hypotheses Verification for RGB-D object recognition and 6DOF pose estimation", IEEE International Conference on Robotics and Automation, Jan. 2013.

Flores, et al., "Removing Pedestrians from Google Street View Images", Computer Vision and Pattern Recognition Workshops, 2010 IEEE Computer Society Conference On, IEE, Piscataway, NJ, pp. 53-58 (Jun. 13, 2010).

Glassner, "Space Subdivision for Fast Ray Tracing." IEEE Computer Graphics and Applications, 4.10, pp. 15-24, 1984.

Golovinskiy, Aleksey, et al. "Min-Cut based segmentation of point clouds." Computer Vision Workshops (ICCV Workshops), 2009 IEEE 12th International Conference on. IEEE, 2009.

Hackel et al., "Contour Detection in unstructured 3D point clouds,"IEEE, 2016 Conference on Computer vision and Pattern recognition (CVPR), Jun. 27-30, 2016, pp. 1-9.

Hao et al., "Structure-based object detection from scene point clouds," Science Direct, V191, pp. 148-160 (2016).

Hu et al., "An improved method of discrete point cloud filtering based on complex environment," International Journal of Applied Mathematics and Statistics, v48, i18 (2013).

International Search Report and Written Opinion for International Patent Application No. PCT/US2013/070996 dated Apr. 2, 2014.

International Search Report and Written Opinion for International Patent Application No. PCT/US2013/053212 dated Dec. 1, 2014.

International Search Report and Written Opinion for corresponding International Patent Application No. PCT/US2016/064110 dated Mar. 20, 2017.

International Search Report and Written Opinion for corresponding International Patent Application No. PCT/US2017/024847 dated Jul. 7, 2017.

International Search Report and Written Opinion for International Application No. PCT/CN2017/083143 dated Feb. 11, 2018.

(56) References Cited

OTHER PUBLICATIONS

International Search Report and Written Opinion for International Application No. PCT/US2018/030419 dated Aug. 31, 2018.
International Search Report and Written Opinion from International Patent Application No. PCT/US2018/030345 dated Sep. 17, 2018.
International Search Report and Written Opinion from International Patent Application No. PCT/US2018/030360 dated Jul. 9, 2018.
International Search Report and Written Opinion from International Patent Application No. PCT/US2018/030363 dated Jul. 9, 2018.
International Search Report and Written Opinion for International Application No. PCT/US2019/025859 dated Jul. 3, 2019.
International Search Report and Written Opinion from International Patent Application No. PCT/US2019/025849 dated Jul. 9, 2019.
International Search Report and Written Opinion from International Patent Application No. PCT/US2019/049761 dated Nov. 15, 2019.
International Search Report and Written Opinion from International Patent Application No. PCT/US2019/051312 dated Nov. 15, 2019.
International Search Report and Written Opinion from International Patent Application No. PCT/US2019/054103 dated Jan. 6, 2020.
International Search Report and Written Opinion from International Patent Application No. PCT/US2019/064020 dated Feb. 19, 2020.
International Search Report and Written Opinion for International Patent Application No. PCT/US2020/027948 dated Jul. 16, 2020.
International Search Report and Written Opinion for International Patent Application No. PCT/US2020/028133 dated Jul. 24, 2020.
International Search Report and Written Opinion from International Patent Application No. PCT/US2020/029134 dated Jul. 27, 2020.
International Search Report and Written Opinion from International Patent Application No. PCT/US2020/028183 dated Jul. 24, 2020.
International Search Report and Written Opinion from International Patent Application No. PCT/US2020/035285 dated Aug. 27, 2020.
International Search Report and Written Opinion for International Patent Application No. PCT/US2021/024805 dated Aug. 2, 2021.
International Search Report and Written Opinion for International Patent Application No. PCT/US2021/057388 dated Feb. 2, 2022.
Jadhav et al. "Survey on Spatial Domain dynamic template matching technique for scanning linear barcode," International Journal of science and research v 5 n 3, Mar. 2016)(Year: 2016).
Jian Fan et al: "Shelf detection via vanishing point and radial projection", 2014 IEEE International Conference on image processing (ICIP), IEEE, (Oct. 27, 2014), pp. 1575-1578.
Kaikai Liu et al., "Enabling Context-Aware Indoor Augmented Reality via Smartphone Sensing and Vision Tracking", ACM Transactions on Multimedia Computing Communications and Applications, Association for Computer Machinery, US, vol. 12, No.
Kang et al., "Kinematic Path-Tracking of Mobile Robot Using Iterative learning Control", Journal of Robotic Systems, 2005, pp. 111-121.
Kay et al. "Ray Tracing Complex Scenes." ACM SIGGRAPH Computer Graphics, vol. 20, No. 4, ACM, pp. 269-278, 1986.
Kelly et al., "Reactive Nonholonomic Trajectory Generation via Parametric Optimal Control", International Journal of Robotics Research, vol. 22, No. 7-8, pp. 583-601 (Jul. 30, 2013).
Lari, Z., et al., "An adaptive approach for segmentation of 3D laser point cloud." International Archives of the Photogrammertry, Remote sensing and spatial information Sciences, vol. XXXVIII-5/W12, 2011, ISPRS Calgary 2011 Workshop, Aug. 29-31, 2011, Calgary, Canada.
Lecking et al.: "Localization in a wide range of industrial environments using relative 3D ceiling features", IEEE, pp. 333-337 (Sep. 15, 2008).
Lee et al. "Statistically Optimized Sampling for Distributed Ray Tracing." ACM SIGGRAPH Computer Graphics, vol. 19, No. 3, ACM, pp. 61-67, 1985.
Li et al., "An improved RANSAC for 3D Point cloud plane segmentation based on normal distribution transformation cells," Remote sensing, V9: 433, pp. 1-16 (2017).
Likhachev, Maxim, and Dave Ferguson. "Planning Long dynamically feasible maneuvers for autonomous vehicles." The international journal of Robotics Reasearch 28.8 (2009): 933-945. (Year:2009).
Marder-Eppstein et al., "The Office Marathon: robust navigation in an indoor office environment," IEEE, 2010 International conference on robotics and automation, May 3-7, 2010, pp. 300-307.
McNaughton, Matthew, et al. "Motion planning for autonomous driving with a conformal spatiotemporal lattice." Robotics and Automation (ICRA), 2011 IEEE International Conference on. IEEE, 2011. (Year: 2011).
Meyersohn, "Walmart turns to robots and apps in stores", https://www.cnn.com/2018/12/07/business/walmart-robot-janitors-dotcom-store/index.html, Oct. 29, 2019.
Mitra et al., "Estimating surface normals in noisy point cloud data," International Journal of Computational geometry & applications, Jun. 8-10, 2003, pp. 322-328.
N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.
Ni et al., "Edge Detection and Feature Line Tracing in 3D-Point Clouds by Analyzing Geometric Properties of Neighborhoods," Remote Sensing, V8 I9, pp. 1-20 (2016).
Norriof et al., "Experimental comparison of some classical iterative learning control algorithms", IEEE Transactions on Robotics and Automation, Jun. 2002, pp. 636-641.
Notice of allowance for U.S. Appl. No. 13/568,175 dated Sep. 23, 2014.
Notice of allowance for U.S. Appl. No. 13/693,503 dated Mar. 11, 2016.

* cited by examiner

OBSTACLE DETECTION FOR A MOBILE AUTOMATION APPARATUS

CROSS-REFERENCE TO RELATED APPLICATIONS

This application claims the benefit of priority to U.S. Provisional Application No. 62/492,670 entitled "Product Status Detection System," filed on May 1, 2017, by Perrella et al., and to U.S. Provisional Application No. 62/492,712 entitled "Obstacle Detection For A Mobile Automation Apparatus," filed on May 1, 2017, by Arandorenko et al., all of which are incorporated herein by reference in their entirety.

BACKGROUND OF THE INVENTION

Mobile automation apparatuses are increasingly being used in retail environments to perform inventory tracking. Such mobile automation apparatuses may be equipped with various sensors to autonomously navigate paths within the retail environment and perform such tasks. During such autonomous navigation, the mobile automation apparatuses may perform ancillary tasks that include data capture, avoiding obstacles, stopping, docking, and the like. Hence, a key issue during such autonomous navigation in a retail environment is to be able to detect static obstacles and/or moving obstacles. Static obstacles include boxes, pillars, reflective stanchions, baskets, and other items found in retail environments. Moving obstacles include shopping carts, retail associates, cleaning equipment, and shoppers. Especially with obstacles such as humans and/or obstacles associated with humans, such as shopping carts, the mobile automation apparatuses must be able to detect these obstacles from a safe distance in order to stop or avoid the obstacles. These challenges are compounded in retail environments where lighting varies in different areas. Furthermore, highly reflective and/or shiny obstacle objects found in the retail environment, such as mirrors, stanchions, see-through glass doors, aisle siding, and other reflective materials, may also cause variable lighting that compounds the challenges associated with obstacle avoidance. In particular, the reflective metal lattice on shopping carts, for example, can be difficult to detect. Indeed, a single sensor by itself does not exist, at low cost, that can detect all of the complex obstacles listed above.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
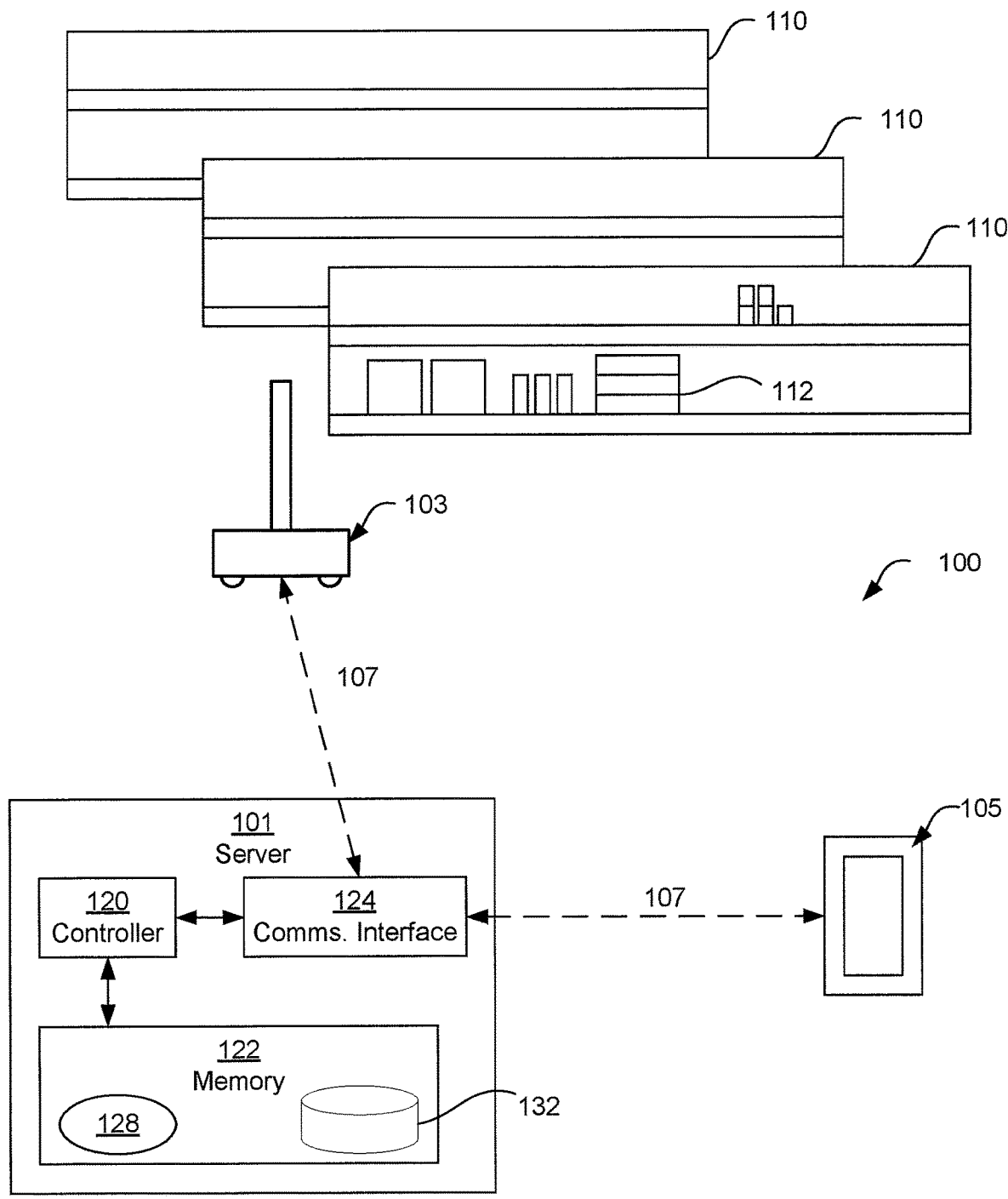
FIG. 1 is a block diagram of a mobile automation system in accordance with some embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a mobile automation apparatus comprising: a support structure extending in an upward direction; a navigation module configured to move the mobile automation apparatus in an environment; a structured light camera positioned on the mast, the structured light camera configured to detect at least a top of a shopping cart in a region adjacent to the mobile automation apparatus; and, a controller configured to: when the structured light camera detects the top of the shopping cart, control the navigation module to implement an obstacle avoidance protocol.

In some embodiments, the structured light camera is located at a height on the mast where the structured light camera acquires images of the top of a shopping cart in the region.

In some embodiments, the structured light camera is at an angle of 45°±5° to the mast, and at a height of between 1.3 meters to 1.8 meters up the mast.

In some embodiments, the mobile automation apparatus further comprises a base, the support structure extending in the upward direction from the base; and one or more of a depth sensing device and a LIDAR device located at the base, and configured to sense depth at an ankle height.

In some embodiments, the mobile automation apparatus further comprises one or more second structured light cameras between a base of the mast and the structured light camera, the one or more second structured light cameras configured to detect objects over respective angles on either side of the region.

In some embodiments, the mobile automation apparatus further comprises one or more ultrasound arrays on the mast, each of the one or more ultrasound arrays configured to detect objects at least in the region. In some embodiments, the controller is further configured to: when the one or more ultrasound arrays detect an object, and the structured light camera simultaneously does not detect the object, control the navigation module to implement the obstacle avoidance protocol. In some embodiments, the controller is further configured to: when the one or more ultrasound arrays detect the object, and the structured light camera simultaneously does not detect the object, control the navigation module to implement the obstacle avoidance protocol only when the object is within a threshold distance.

In some embodiments, the navigation module configured to move the mobile automation apparatus in the environment in a forward direction, and the structured light camera is further configured to detect at least the top of the shopping cart in the region in the forward direction.

In some embodiments, the obstacle avoidance protocol comprises one or more of: stopping the navigation module, slowing the navigation module and controlling the navigation module to avoid the shopping cart.

A further aspect of the specification provides a method comprising: at a mobile automation apparatus comprising: a support structure extending in an upward direction; a navigation module configured to move the mobile automation apparatus in an environment; a structured light camera positioned on the mast, the structured light camera configured to detect at least a top of a shopping cart in a region adjacent to the mobile automation apparatus; and, a controller, when the structured light camera detects the top of the shopping cart, controlling, using the controller, the navigation module to implement an obstacle avoidance protocol.

A further aspect of the specification provides a mobile automation apparatus comprising: a support structure extending in an upward direction; a navigation module configured to move the mobile automation apparatus in an environment; at least one structured light camera located on the mast, the at least one structured light camera configured to detect objects over a region; one or more ultrasound arrays on the mast, each of the one or more ultrasound arrays configured to detect the objects over the region; and, a controller configured to: when the one or more ultrasound arrays detect an object, and the at least one structured light camera simultaneously does not detect the object, control the navigation module to implement an obstacle avoidance protocol.

In some embodiments, the controller is further configured to: when the one or more ultrasound arrays detect the object, and at least one structured light camera simultaneously does not detect the object, control the navigation module to implement the obstacle avoidance protocol only when the object is within a threshold distance.

In some embodiments, the navigation module is configured to move the mobile automation apparatus in the environment in a forward direction, and at least one structured light camera and the one or more ultrasound arrays are further configured to detect the objects in the forward direction.

In some embodiments, the obstacle avoidance protocol comprises one or more of: stopping the navigation module, slowing the navigation module and controlling the navigation module to avoid the object.

In some embodiments, the structured light camera is mounted at an angle of 45°±5° to the mast, and at a height of between 1.3 meters to 1.8 meters up the mast.

In some embodiments, the one or more ultrasound arrays are further configured to detect the objects over a 360° field of view.

A further aspect of the specification provides a method comprising: at a mobile automation apparatus comprising: a support structure extending in an upward direction; a navigation module configured to move the mobile automation apparatus in an environment; at least one structured light camera located on the mast, the at least one structured light camera configured to detect objects over a region; one or more ultrasound arrays on the mast, each of the one or more ultrasound arrays configured to detect the objects over the region; and, a controller, when the one or more ultrasound arrays detect an object, and the at least one structured light camera simultaneously does not detect the object, controlling, using the controller, the navigation module to implement an obstacle avoidance protocol.

A further aspect of the specification provides a mobile automation apparatus comprising: a support structure extending in an upward direction; a navigation module configured to move the mobile automation apparatus in an environment; at least one structured light camera located on the mast, the at least one structured light camera configured to detect objects over a region; one or more ultrasound arrays on the mast, each of the one or more ultrasound arrays configured to detect the objects over the region; and, a controller, wherein when the one or more ultrasound arrays detect an object and the at least one structured light camera simultaneously does not detect the object, the controller controls the navigation module to implement an obstacle avoidance protocol.

A further aspect of the specification provides a mobile automation apparatus comprising an ultrasound sensor; a structured light camera positioned higher than the ultrasound sensor; a controller configured to compare ultrasound sensor data to structured light data; and a navigation module configured to alter the navigation of the mobile automation apparatus based on the comparison. In some embodiments, the mobile automation apparatus further comprises a communication interface configured to transmit a notification of the alteration to a mobile device. In some embodiments, the notification includes a location of the mobile automation apparatus.

FIG. 1 depicts a mobile automation system 100 in accordance with the teachings of this disclosure. Such a mobile automation system 100 may be operated in a retail facility, such as a store, supermarket, shopping mall, showroom, warehouse club, convenience store, or within a service facility such as a restaurant or pharmacy, or within a warehouse, factory, or industrial facility. The facility may include multiple shelf modules 110 positioned within the facility. The shelf modules 110 may be arranged to define a plurality of aisles. At least one zone of the facility may include shelf modules 110, aisles, walls, posts, pillars, bins, conveyors or equipment. The system 100 includes a server 101 in communication with at least one mobile automation apparatus 103 (also referred to herein simply as the apparatus 103) and at least one mobile device 105 via communication links 107, illustrated in the present example as including wireless links. The system 100 is deployed, in the illustrated example, in a retail environment including a plurality of shelf modules 110 each supporting a plurality of products 112. Each shelf module has one or more generally planar shelves, generally extending along a length of the shelf module and oriented at various vertical heights for supporting a plurality of products 112 in positions conducive to retail merchandising. Each shelf also has a front edge that may be used to position shelf merchandising materials 114 such as a price label, an electronic shelf label, shelf talker, advertising signage, or a coupon dispensing apparatus. The apparatus 103 may be deployed within the facility where it may move between one or more zones of the facility, monitoring a region in proximity to the apparatus 103. More specifically, the apparatus 103 is deployed within the retail environment, and controlled by the server 101 (via the link 107) to travel the length of at least a portion of the shelf module 110. The apparatus 103 is equipped with a plurality of data capture sensors, such as image sensors (e.g. one or more digital cameras) and depth sensors (e.g. one or more Light Detection and Ranging (LIDAR) sensors), and is further configured to employ the sensors to capture sensor data, that may be associated with a shelf module, products positioned on the shelf module, or shelf merchandising materials. In the present example, the apparatus 103 is configured to capture a series of digital images of the modules 110, as well as a series of depth measurements, each describing the distance and direction between the apparatus 103 and a point on or enclosed by a module 110.

The server 101 includes a controller 120, interconnected with a non-transitory computer readable storage medium, such as a memory 122. The memory 122 includes any suitable combination of volatile (e.g. Random Access Memory or RAM) and non-volatile memory (e.g. read only memory or ROM, Electrically Erasable Programmable Read Only Memory or EEPROM, flash memory, hard drive). In general, the controller 120 and the memory 122 each comprise one or more integrated circuits. The controller 120, for example, includes any suitable combination of central processing units (CPUs) and graphics processing units (GPUs) and/or any suitable combination of field-programmable gate arrays (FPGAs) and/or application-specific integrated circuits (ASICs) configured to implement the specific functionality of the server 101. In an embodiment, the controller 120, further includes one or more central processing units (CPUs) and/or graphics processing units (GPUs). In an embodiment, a specially designed integrated circuit, such as a Field Programmable Gate Array (FPGA), is designed to perform specific functionality of the server 101, either alternatively or in addition to the controller 120 and the memory 122. As those of skill in the art will realize, the mobile automation apparatus 103 also includes one or more controllers or processors and/or FPGAs, in communication with the controller 120, specifically configured to control navigational and/or data capture aspects of the mobile automation apparatus 103.

The server 101 also includes a communications interface 124 interconnected with the controller 120. The communications interface 124 includes any suitable hardware (e.g. transmitters, receivers, network interface controllers and the like) allowing the server 101 to communicate with other computing devices—particularly the apparatus 103 and the mobile device 105—via the links 107. In some embodiments, a link 107 may be a direct wired link, such as a cable or data bus. It some embodiments a link 107 may be a direct wireless link, such as a radio signal, infrared communication, or sound communication. In some embodiments, a link 107 may be a networked communication that traverses one or more networks, such as a local area network or wide-area network. The specific components of the communications interface 124 are selected based on the type of communication links (e.g. networks) enabled by the server 101. In the present example, a wireless local-area network is implemented within the retail environment via the deployment of one or more wireless access points. The links 107 therefore include both wireless links between the apparatus 103 and the mobile device 105 and the above-mentioned access points, and a wired link (e.g. an Ethernet-based link) between the server 101 and the access point.

The memory 122 stores a plurality of applications, each including a plurality of computer readable instructions executable by the controller 120. The execution of the above-mentioned instructions by the controller 120 configures the server 101 to perform various actions discussed herein. The applications stored in the memory 122 include a control application 128, which may also be implemented as a suite of logically distinct applications. In general, via execution of the control application 128 or subcomponents thereof, the controller 120 is configured to implement various functionality. The controller 120, as configured via the execution of the control application 128, is also referred to herein as the controller 120. As will now be apparent, some or all of the functionality implemented by the controller 120 described below may also be performed by preconfigured hardware elements (e.g. one or more ASICs) rather than by execution of the control application 128 by the controller 120.

In general, the controller 120 is configured to control the apparatus 103 to capture data, and to obtain the captured data via the communications interface 124 and store the captured data in a repository 132 in the memory 122. The server 101 is further configured to perform various post-processing operations on the captured data, and to detect the status of the products 112 on the modules 110. When certain status indicators are detected, the server 101 is also configured to transmit status notifications to the mobile device 105.

For example, in some embodiments, the server 101 is configured via the execution of the control application 128 by the controller 120, to process image and depth data captured by the apparatus 103 to identify portions of the captured data depicting a back of a module 110, and to detect gaps between the products 112 based on those identified portions. Furthermore, the server 101 is configured to provide a map and/or paths and/or path segments and/or navigation data and/or navigation instructions to the apparatus 103 to enable the apparatus 103 to navigate the modules 110.

Figure 2:
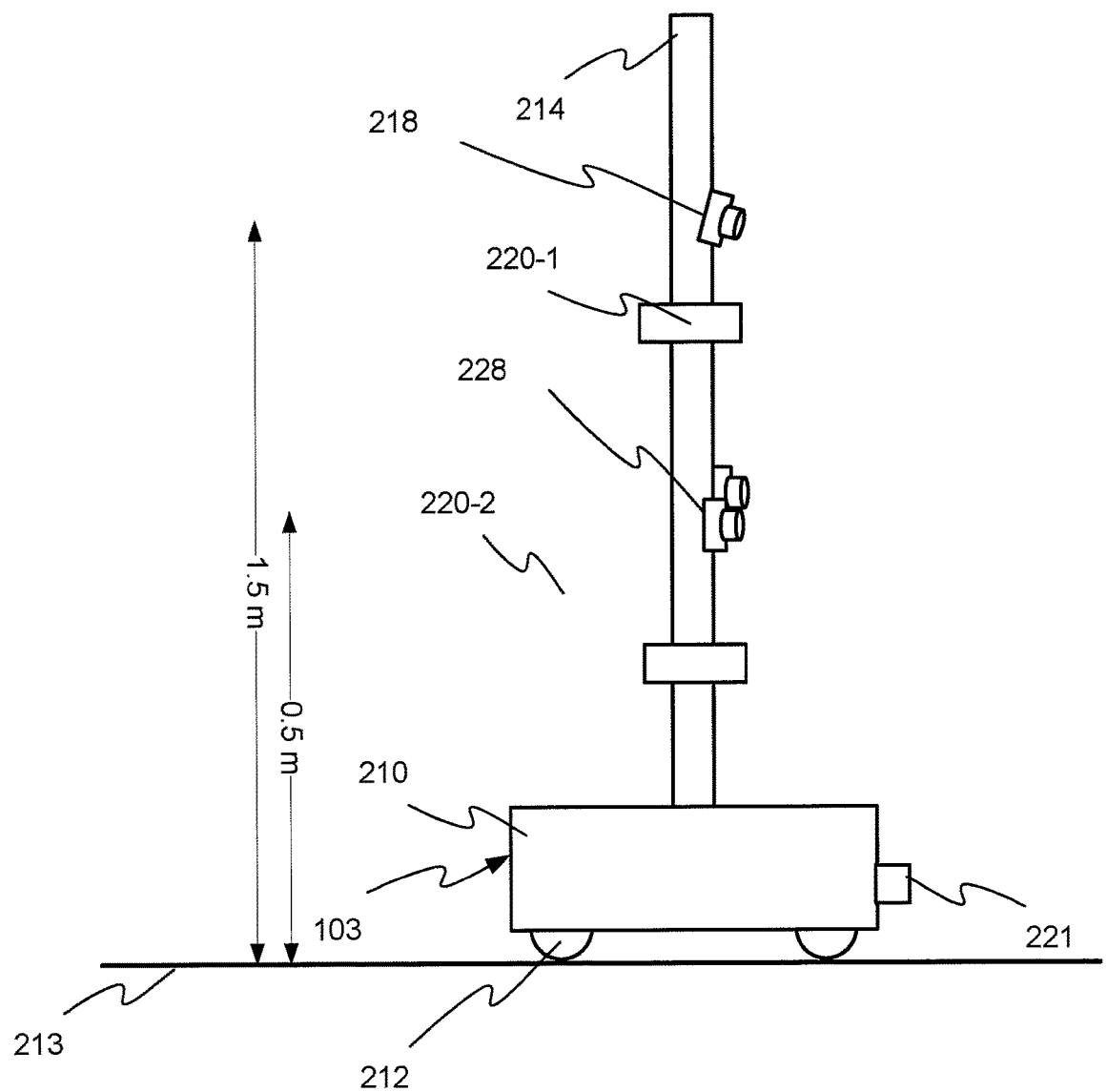
FIG. 2 is a side view of a mobile automation apparatus in accordance with some embodiments.
Figure 3:
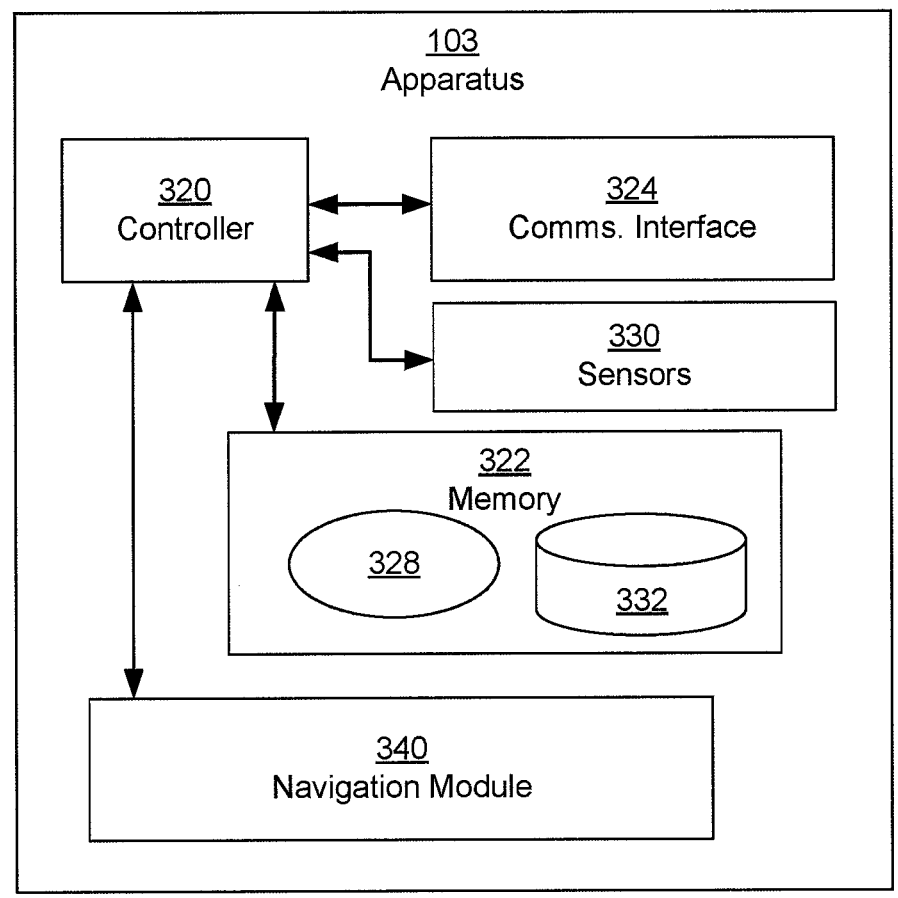
FIG. 3 is a block diagram of the mobile automation apparatus of FIG. 2 in accordance with some embodiments.

Attention is next directed to FIG. 2 and FIG. 3 which respectively depict: a schematic side perspective view of the apparatus 103, showing particular sensors of the apparatus 103; and a schematic block diagram of the apparatus 103.

With reference to FIG. 2, the apparatus 103 generally comprises: a base 210 configured to move on wheels 212 (e.g. on a floor 213 of the environment), and the like; and a mast 214 and/or a support structure extending in an upward direction (e.g. vertically) from the base 210. However, in other embodiments, the base 210 moves on devices other than wheels, for example casters, tracks and the like.

The apparatus 103 is further provisioned with various sensors for obstacle avoidance which include, but are not limited to: a structured light camera 218 located on the mast 214, the structured light camera 218 configured to detect objects over a region, for example in a field of view of the structured light camera 218; one or more ultrasound arrays 220-1, 220-2 on the mast 214, each of the one or more ultrasound arrays 220-1, 220-2 configured to detect objects over the region in which the structured light camera 218 is configured to detect objects; one or more of a depth sensing device and a LIDAR device 221 located at the base 210, and configured to sense depth at an ankle height (e.g. over the region in which the structured light camera 218 is configured to detect objects); and one or more second structured light cameras 228 between a bottom end of the mast 214 and the structured light camera 218, the one or more second structured light cameras 218 configured to detect objects over respective angles on either side of the region (e.g. the region in which the structured light camera 218 is configured to detect objects).

It is further understood that detection of an object as described herein includes, but is not limited to, detection of a portion of an object and further understood that different sensors may detect different portions of the same object.

While not depicted, the base 210 and the mast 214 may be provisioned with other various navigation sensors for navigating in the environment in which the modules 110 are located and various further data acquisition sensors for acquiring electronic data and/or digital data associated with the modules 110, products 112, or shelf merchandising materials 114. Such data may be used for one or more of stock detection, low stock detection, price label verification, plug detection, planogram compliance and the like.

As depicted, the location and geometry of the structured light camera 218 on the mast 214 is selected such that the structured light camera 218 is configured to detect at least a top of a shopping cart in a region adjacent to the mobile automation apparatus 103. For example, the structured light camera 218 is located at a height on the mast 214 where the structured light camera 218 acquires images of a top of a shopping cart in a region adjacent the mobile automation apparatus 103. Indeed, the structured light camera 218 is generally configured to detect at least a top of a shopping cart in a region adjacent to the mobile automation apparatus 103. For example, shopping carts are generally about 0.8 m high. Hence, the structured light camera 218 may be mounted as depicted at an angle of 45°±5° to the mast 214, and at a height of between 1.3 meters to 1.8 meters up the mast 214, for example, as depicted, at about 1.5 m from a bottom of the wheels 212 or above the floor 213.

Other geometries of the structured light camera 218 are within the scope of present embodiments. However, as the structured light camera 218 is generally pointing towards the floor 213, the structured light camera 218 is generally configured to detect objects in the field of view of structured light camera 218 including objects on the floor 213 that may not be detectable by the other sensors.

The structured light camera 218 is generally configured to detect objects by projecting structured light (including, but not limited to, infrared light) onto a region, including, but not limited to one or more of vertical stripes, horizontal stripes, dots, and the like, and acquiring images of the structure light projected onto the region (including, but not limited to, infrared images). Discontinuities in the structured light detected in the acquired images indicate objects in the field of view of the structured light camera 218. In other words, the region in which objects are detected is the field of view of the structured light camera 218 that is illuminated by the projected images. Hence, the structured light camera 218 is configured to detect at least a top of a shopping cart in a field of view of the structured light camera 218, which depends on the angle and height of the structured light camera 218.

Figure 10:
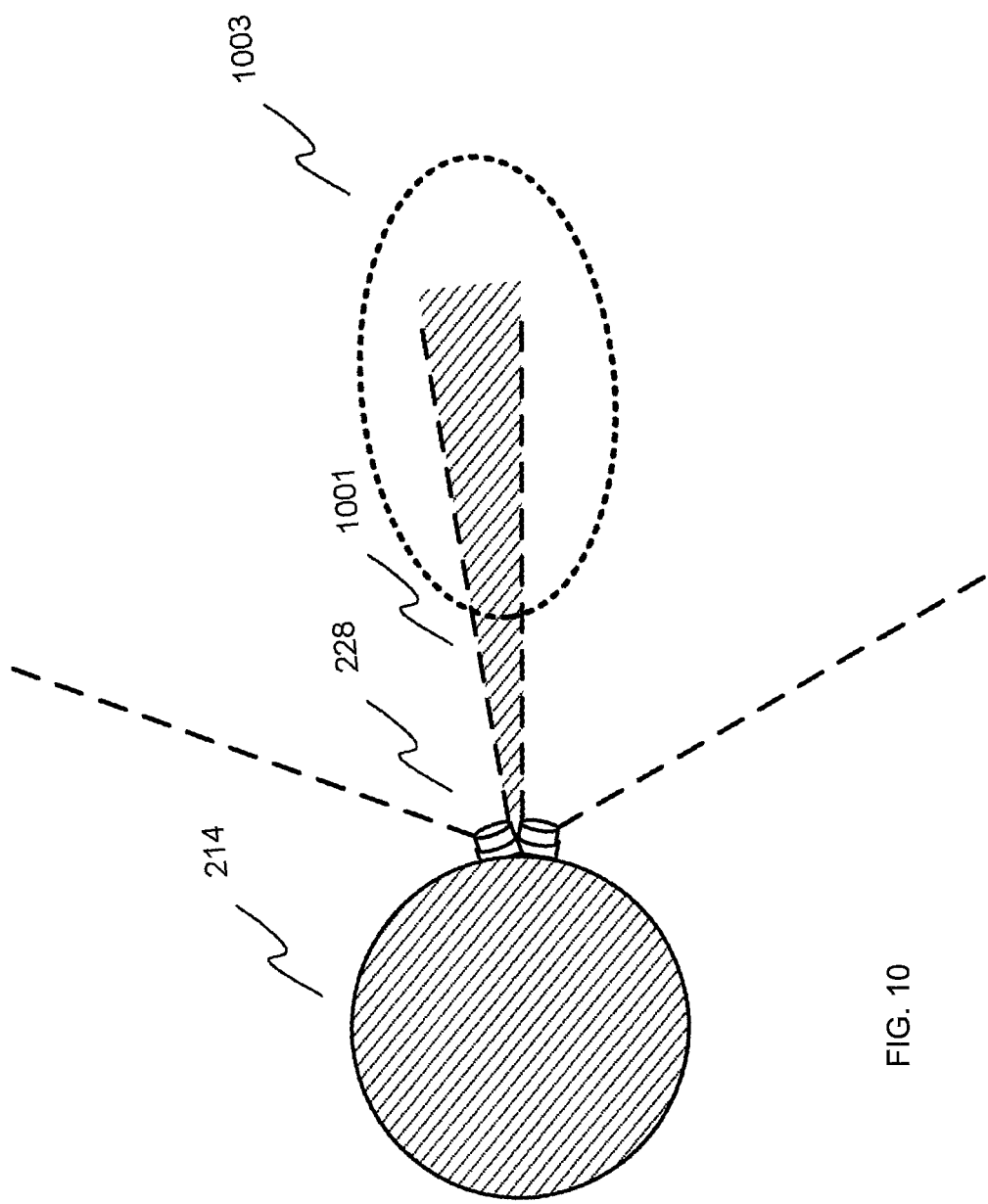
FIG. 10 depicts an arrangement of fields of view of structured light cameras at the mobile automation apparatus of FIG. 2 in accordance with some embodiments Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present invention.

The two or more structured light cameras 228 operate in a similar fashion, but are aimed about perpendicularly away from the mast 214, however at different angles. In a particular embodiment, the two or more structured light cameras 218 are aimed without an overlap in their fields of view, with a gap therebetween being filled in by the field of view of the structured light camera 218. An example geometry of the two or more structured light cameras 228 is described below with respect to FIG. 10.

Furthermore, while the one or more ultrasound arrays 220-1, 220-2 are at least configured to detect objects over the region in which objects are detected by the structured light camera 218, in some embodiments, the one or more ultrasound arrays 220-1, 220-2 are further configured to detect the objects circumferentially around the mast 214 and/or the apparatus 103. An ultrasound array 220 may be configured to detect objects in any direction from the mast (360° detection) or only in certain angular regions around the mast 214 and/or the apparatus 103. The one or more ultrasound arrays 220-1, 220-2 are interchangeably referred to hereafter, collectively, as ultrasound arrays 220 and, generically, as an ultrasound array 220. Furthermore, in some embodiments, the ultrasound arrays 220 comprise phased ultrasound arrays.

The ultrasound arrays 220 generally operate by transmitting an ultrasound pulse and receiving reflections of the ultrasound pulse from objects in a range of the transmitted ultrasound pulse, for example in a phased manner. Indeed, each of the ultrasound arrays 220 generally comprises a plurality of ultrasound transducers arranged circumferentially around the mast 214 which transmit respective ultrasound pulses in a phased manner. Overlaps in the fields of view of adjacent ultrasound transducers can assist with pinpointing a general location of an object reflecting a respective ultrasound pulse. For example, if an object is detected by a first ultrasound transducer, but not detected by a second adjacent ultrasound transducer, the object is located in an angular region associated with only the first ultrasound transducer; however, an object detected by both the first and the second ultrasound transducers is located in an angular region within the overlapping fields of view of the two adjacent ultrasound transducers.

The LIDAR device 221 generally operates by transmitting laser pulses (e.g. an infrared laser pulse) at a plurality of known angles, and a sensor (e.g. a light sensor and/or an infrared sensor) at the LIDAR device 221 measures a distance to a point of interaction with a surface using a time-of-flight measurement. The LIDAR device 221 is generally at an ankle height, for example between about 5 cm to about 10 cm from the floor 213 and is generally configured to scan over a plane horizontal to the floor 213. Hence, the LIDAR device 221 is configured to detect wheels of shopping carts, legs of modules 110, and the like. However, other depth detecting devices may be used in place of the LIDAR device 221 in other embodiments.

Furthermore, one or more combinations of sensor data from the sensors (e.g. the structured light cameras 218, 228, the one or more ultrasound arrays 220, and the LIDAR device 221) are useable by the apparatus 103 to determine a distance of an object from each respective sensor. For example, structured light images can indicate distance of objects, as can data from LIDAR devices and ultrasound arrays.

In addition, in some embodiments, the apparatus 103 is generally configured to move in a forward direction, for example, in a direction being imaged by the LIDAR device 221. In some of these embodiments, the structured light camera 218 is further configured to detect at least a top of a shopping cart in a region in the forward direction and/or a movement direction.

Data from the various obstacle sensors at the apparatus 103 may be processed at the apparatus 103 and used to avoid obstacles including, but not limited to shopping carts.

For example, attention is next directed to FIG. 3 which depicts a schematic block diagram of further components of the apparatus 103. In particular, the apparatus 103 includes a special purpose controller 320 specifically designed to implement obstacle detection as described herein. The controller 320 is connected to a non-transitory computer readable storage medium, such as a memory 322. The memory 322 includes any suitable combination of volatile (e.g. Random Access Memory or RAM) and non-volatile memory (e.g. read only memory or ROM, Electrically Erasable Programmable Read Only Memory or EEPROM, flash memory, hard drive). In general, the controller 320 and the memory 322 each comprise one or more integrated circuits. The controller 320, for example, includes any suitable combination of central processing units (CPUs) and graphics processing units (GPUs) and/or any suitable combination of field-programmable gate arrays (FPGAs) and/or application-specific integrated circuits (ASICs) configured to implement the specific functionality of the apparatus 103. Further, as depicted, the memory 322 includes a repository 332 for storing data, for example data collected by sensors 330. In an embodiment, the controller 320, further includes one or more central processing units (CPUs) and/or graphics processing units (GPUs). In an embodiment, a specially designed integrated circuit, such as a Field Programmable Gate Array (FPGA), is designed to implement obstacle detection as discussed herein, either alternatively or in addition to the controller 320 and memory 322. As those of skill in the art will realize, the mobile automation apparatus 103 can also include one or more special purpose controllers or processors and/or FPGAs, in communication with the controller 320, specifically configured to control navigational and/or data capture aspects of the mobile automation apparatus 103.

The apparatus 103 also includes a communications interface 324 interconnected with the controller 320. The communications interface 324 includes any suitable hardware (e.g. transmitters, receivers, network interface controllers and the like) allowing the apparatus 103 to communicate with other devices—particularly the server 101 and, optionally, the mobile device 105—for example via the links 107, and the like. The specific components of the communications interface 324 are selected based on the type of network or other links over which the apparatus 103 is required to communicate, including, but not limited to, the wireless local-area network of the retail environment of the system 100.

The memory 322 stores a plurality of applications, each including a plurality of computer readable instructions executable by the controller 320. The execution of the above-mentioned instructions by the controller 320 configures the apparatus 103 to perform various actions discussed herein. The applications stored in the memory 322 include a control application 328, which may also be implemented as a suite of logically distinct applications. In general, via execution of the control application 328 or subcomponents thereof, the controller 320 is configured to implement various functionality. The controller 320, as configured via the execution of the control application 328, is also referred to herein as the controller 320. As will now be apparent, some or all of the functionality implemented by the controller 320 described below may also be performed by preconfigured hardware elements (e.g. one or more ASICs) rather than by execution of the control application 328 by the controller 320.

The apparatus 103 further includes sensors 330, including, but not limited to, the structured light camera 218, the one or more ultrasound arrays 220, the LIDAR device 221 (and/or any other depth sensing device at the same location), the one or more second structured light cameras 228, and other navigation and/or data acquisition sensors.

The apparatus 103 further includes a navigation module 340 configured to move the apparatus 103 in an environment, for example the environment of the modules 110. The navigation module 340 comprises any suitable combination of motors, electric motors, stepper motors, and the like configured to drive and/or steer the wheels 212, and the like, of the apparatus 103. The apparatus 103 generally includes sensors (e.g. a wheel odometer, an IMU (inertial measurement unit), and the like for measuring distances travelled by the apparatus 103.

Hence, in general, the controller 320 is configured to control the apparatus 103 to: navigate the environment of the module 110 using data from the navigation sensors (which can include, but is not limited to, the structured light cameras 218, 228, the LIDAR device 221 and the one or more ultrasound arrays 220) to control the navigation module 340; and control the data acquisition sensors to acquire sensor data, such as electronic data and/or digital data used for one or more of stock detection, low stock detection, price label verification, plug detection, planogram compliance and the like. For example, while not depicted, the memory 322 further stores a map, and the like, of the environment, which may be used for navigation in conjunction with the navigation sensors. The memory may also store sensor data from the data acquisition sensors that may be transmitted to the server 101 for processing.

In the present example, in particular, the apparatus 103 is configured via the execution of the control application 328 by the controller 320, to avoid obstacles using at least camera data from the structured light camera 218.

Figure 4:
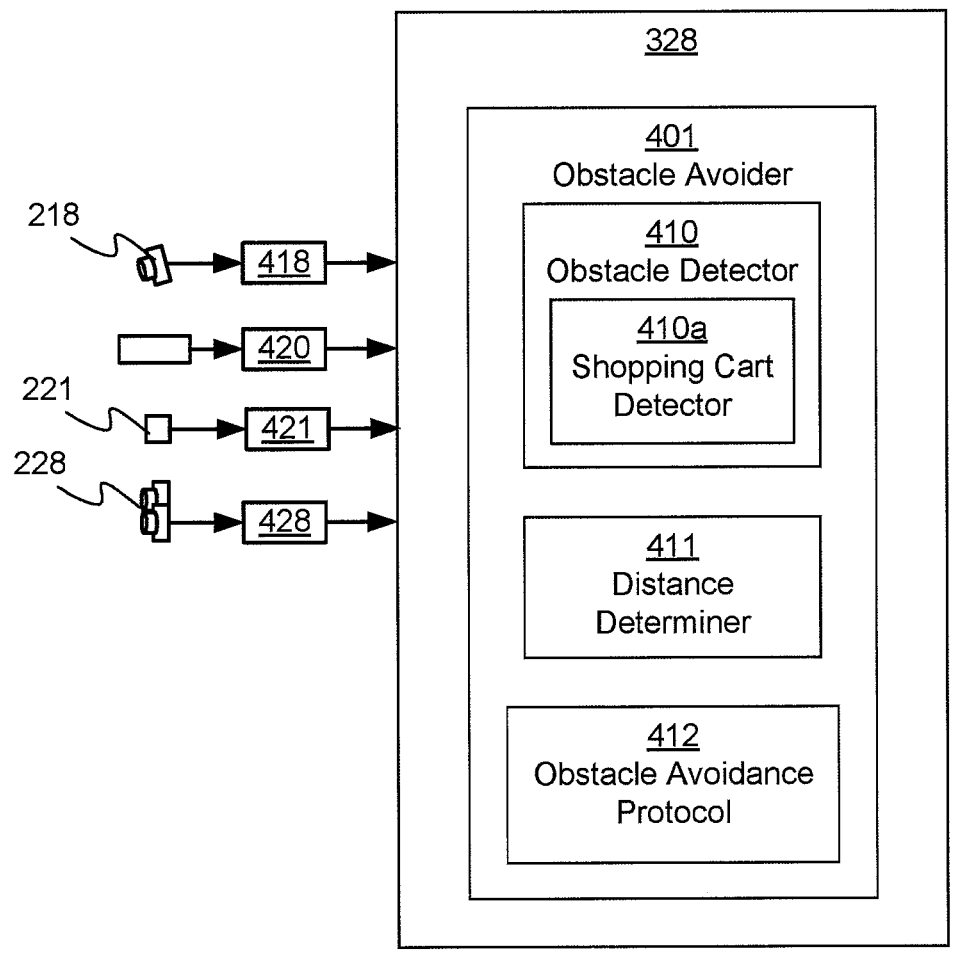
FIG. 4 is a block diagram of a control application in accordance with some embodiments

Turning now to FIG. 4, before describing the operation of the application 328 to avoid obstacles, certain components of the application 328 will be described in greater detail. As will be apparent to those skilled in the art, in 15 examples the components of the application 328 may be separated into distinct applications, or combined into other sets of components. Some or all of the components illustrated in FIG. 4 may also be implemented as dedicated hardware components (e.g. one or more FPGAs and/or one or more ASICs).

As depicted the application 328 is depicted as receiving camera data 428 (e.g. images) from the structured light camera 218, as well as ultrasound data 420 from the one or more ultrasound arrays 220, LIDAR data 421 from the LIDAR device 221 and further camera data 428 (e.g. images) from the one or more second structured light cameras 228.

The control application 328 includes an obstacle avoider 401. In brief, the obstacle avoider 401 is configured to process one or more of the camera data 418, the ultrasound data 420, the LIDAR data 421 and the further camera data 428 to avoid obstacles.

The obstacle avoider 401 includes: an obstacle detector 410 (also referred to herein simply as a detector 410), a distance determiner 411, and an obstacle avoidance protocol 412. In brief, the detector 410 is configured to process camera data 418 captured by the structured light camera 218 to determine whether an object has been detected or not and, depending on a distance to the object, as determined by the distance determiner 411, the obstacle avoidance protocol 412 is used to control the navigation module 340 to avoid the object. As depicted, the obstacle detector 410 includes a shopping cart detector 410a configured to process the camera data 418 captured by the structured light camera 218 to determine whether the object includes a shopping cart and, in particular, a top of a shopping cart.

In some embodiments, each of the detector 410 and shopping cart detector 410a comprises signature data (e.g., sensor output signatures indicative of detecting a shopping cart object) and/or threshold data and/or algorithms respectively associated with detecting objects, including shopping carts, using, for example, each of the camera data 418, the ultrasound data 420, the LIDAR data 421 and the further camera data 428.

One or more of the camera data 418, the ultrasound data 420, the LIDAR data 421 and the further camera data 428 is used by the distance determiner 411 to determine a distance of an object to the apparatus 103 (and/or a respective sensor), which implements any number of distance determining techniques.

Figure 5:
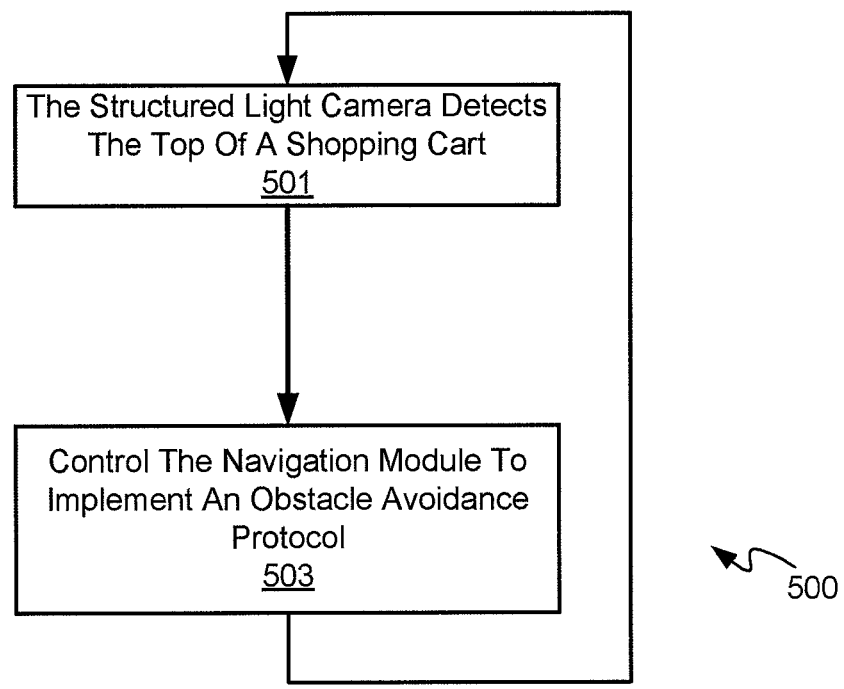
FIG. 5 is a flowchart of a method of shopping cart detection for a mobile automation apparatus in accordance with some embodiments.

Attention is now directed to FIG. 5 which depicts a flowchart representative of an example method 500 for obstacle avoidance and, in particular, shopping cart avoidance. The example operations of the method 500 of FIG. 5 correspond to machine readable instructions that are executed by, for example, the apparatus 103, and specifically by the controller 320 and/or the various components of the control application 328 including, but not limited to, the obstacle avoider 401. Indeed, the example method 500 of FIG. 5 is one way in which the apparatus 103 is configured. However, the following discussion of the example method 500 of FIG. 5 will lead to a further understanding of the apparatus 103, and its various components. However, it is to be understood that in other embodiments, the apparatus 103 and/or the method 500 are varied, and hence need not work exactly as discussed herein in conjunction with each other, and that such variations are within the scope of present embodiments.

Furthermore, the example method 500 of FIG. 5 need not be performed in the exact sequence as shown and likewise, in other embodiments, various blocks may be performed in parallel rather than in sequence. Accordingly, the elements of method 500 are referred to herein as "blocks" rather than "steps." The example method 500 of FIG. 5 may be implemented on variations of the example apparatus 103, as well.

At block 501, the controller 320 determines whether the structured light camera 218 has detected a top of a shopping cart. For example, the block 501 occurs using the shopping cart detector 410a in conjunction with camera data 418 from the structured light camera 218, such as by comparing the camera data 418 with sensor output signature that is indicative of detecting a top of a shopping cart object.

At the block 503, when the structured light camera 218 detects the top of the shopping cart, the controller 320 controls the navigation module 340 to implement the obstacle avoidance protocol 412. For example, the obstacle avoidance protocol 412 comprises one or more of: stopping the navigation module 340 (e.g. stopping the apparatus 103), slowing the apparatus 103, and controlling the navigation module 340 to avoid the shopping cart (e.g. steer the apparatus 103 around the shopping cart 603).

The method 500 repeats each time the controller 320 determines that the structured light camera 218 has detected a top of a shopping cart at block 501. Hence, the method 500 generally runs in parallel with other methods at the apparatus 103, including, for example other data detection methods (e.g. for detecting prices, barcodes, and the like) and/or navigation methods.

Figure 6:
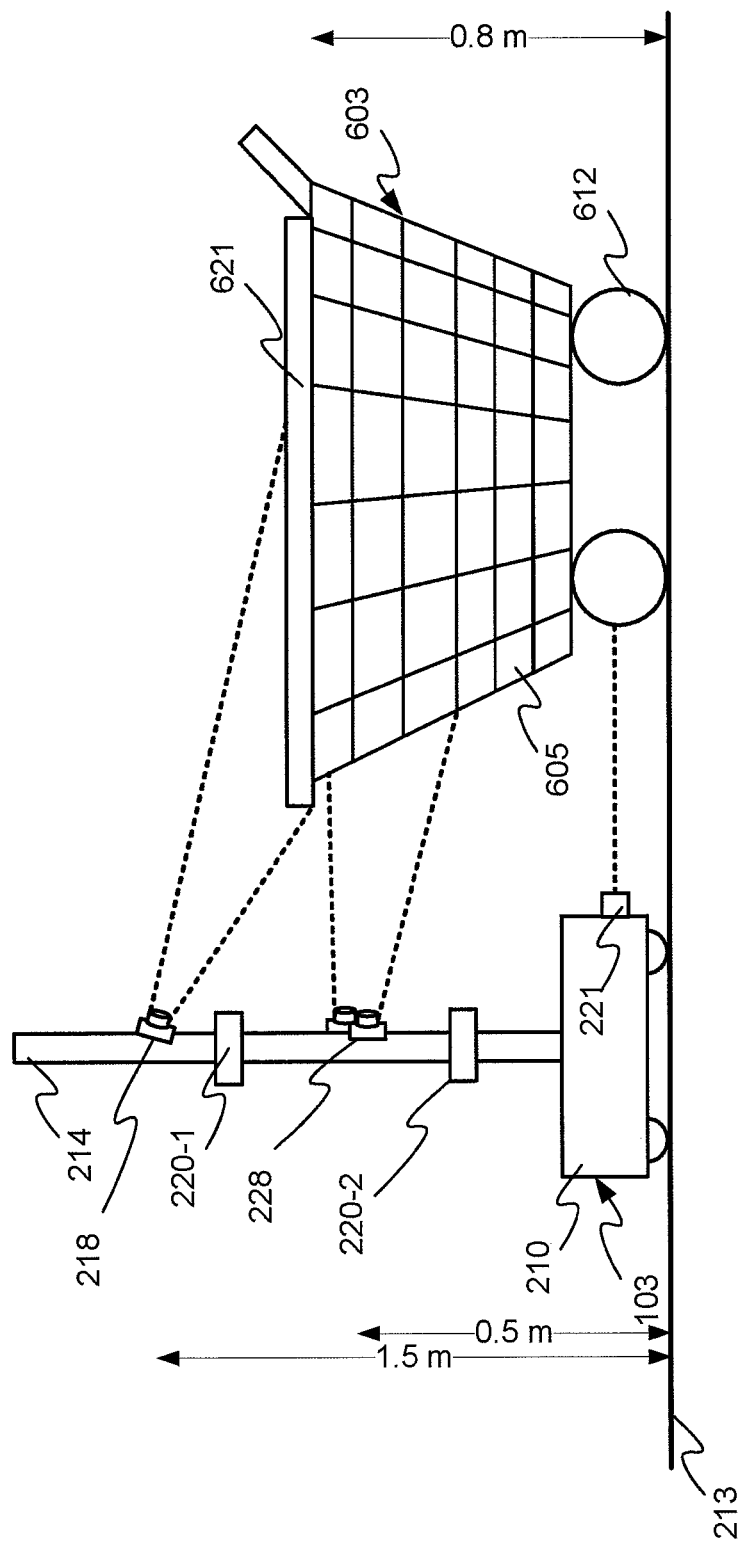
FIG. 6 is a side view of the mobile automation apparatus of FIG. 2 detecting a shopping cart in accordance with some embodiments.

The method 500 is now described with reference to FIG. 6, which is substantially similar to FIG. 2, with like elements having like numbers, but includes a shopping cart 603 comprising an angled reflective metal lattice 605 and/or mesh, on wheels 612, with a bumper 621, and the like, located at a top of the shopping cart 603. The bumper 621 is generally manufactured from one or more of plastic, rubber, resin, and the like. In other embodiments, however, the bumper 621 is part of the lattice 605, where the bumper 621 is one or more of painted, anodized, scratched, so as to be rendered more detectable, by the structured light cameras 218, 228, than the remainder of the lattice 605. Either way, the bumper 621 is generally a part of a bumper and/or a top rim of the shopping cart 603. In the depicted example, the bumper 621 is further located about 0.8 m above the floor 213 and/or the height of the top of the shopping cart 603 is about 0.8 m. The bumper 621 can be a ring around the top of the shopping cart 603 and can be colloquially referred to as a plastic protector ring.

Furthermore, as depicted, the shopping cart 603 is located in a region being imaged by the structured light cameras 218, 228, and the LIDAR device 221. The behavior of the ultrasound arrays 220 is described below.

As depicted, the LIDAR device 221 is attempting to depth scan the wheels 612 (as indicated by the dotted line extending from the LIDAR device 221), and the two or more further structured light cameras 228 are attempting to image the metal lattice 605. However, as the wheels 612 are generally inset from an outside perimeter of the shopping cart 603 (e.g. due to the angle of the lattice 605, which widens from bottom to top) and/or the wheels 612 occupy only a portion of the space under the shopping cart 603, a depth detection of the wheels 612 by the LIDAR device 221 is generally a poor indication of the position of the shopping cart 603; in other words, a front edge of the shopping cart could collide with the apparatus 103 prior to the wheels 612 being detected.

Similarly, the two or more structured light cameras 228 are imaging (as indicated by the dotted lines extending from the two or more structured light cameras 228) the metal lattice 605, which generally is both specularly reflective of light (e.g. the structured light projected by the two are more structured light cameras 228) and includes various air gaps between the metal portions of the lattice which provide no reflections. Hence, the imaging of the metal lattice by the two or more structured light cameras 228 is generally prone to error and/or can be unreliable.

However, due to the location and orientation of the structured light camera 218, the structured light camera 218 is configured to detect at least a top of the shopping cart 603, and in particular the non-reflective bumper 621, in a region adjacent to the mobile automation apparatus 103. As the bumper 621 is not specularly reflective, and is also a solid piece (e.g. lacking air gaps), the camera data 418 from the structured light camera 218 provides a more reliable indication of whether there is a shopping cart adjacent the apparatus 103.

Figure 9:
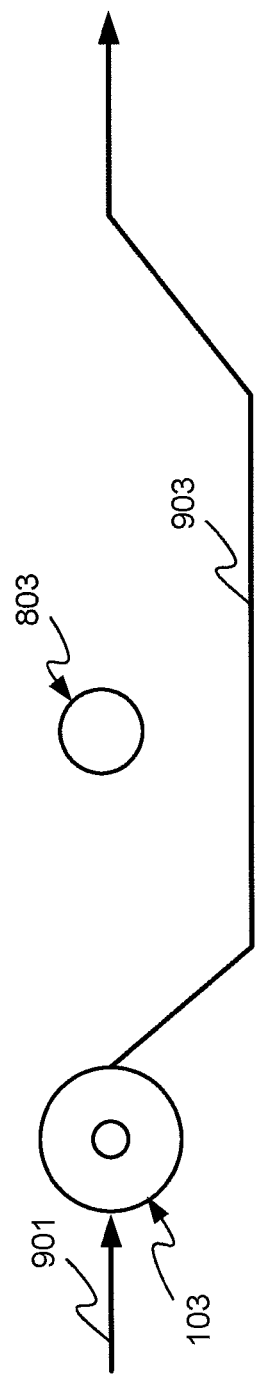
FIG. 9 depicts the mobile automation apparatus of FIG. 2 implementing an obstacle avoidance protocol in accordance with some embodiments.

In any event, once the shopping cart 603 is detected by the structured light camera 218, as determined using, for example, the shopping cart detector 410a, the controller 320 controls the navigation module 340 to stop and/or slow down and/or navigate around the shopping cart 603. For example, the navigation module 340 moves the apparatus 103 to a new path that goes around the shopping cart 603 (e.g. as depicted in FIG. 9).

The region where the top of the shopping cart 603 is detectable by the structured light camera 218 is generally controlled by adjusting the height and orientation of the structured light camera 218. For example, by raising the structured light camera 218 on the mast 214, and/or increasing the angle of the structured light camera 218 outwards from the mast 214, the structured light camera 218 detects the shopping cart 603 when it is further from the apparatus 103; similarly, by lowering the structured light camera 218 on the mast 214, and/or decreasing the angle of the structured light camera 218 inwards, the structured light camera 218 detects the shopping cart 603 when it is closer to the apparatus 103. The structured light camera 218 is, however, at a height and orientation where the bumper 621 of the shopping cart 603 is in a field of view of the structured light camera 218. Hence, in general, the height and orientation of the structured light camera 218 is based on a height of a shopping cart and a distance at which the shopping cart is to be detected. In the depicted embodiments, the shopping cart 603 is about 0.8 m high, and the structured light camera 218 is at a height of about 1.5 m, and an angle of about 45°±5°; hence the shopping cart 603 is detectable about 1 m away from the apparatus 103, which is a sufficient distance for the apparatus 103 to navigate around the shopping cart 603 when detected. However other heights and orientations are within the scope of present embodiments.

In some embodiments, the one or more ultrasound arrays 220 are used to determine a false negative at the structured light camera 218 and/or the second structured light cameras 228. For example, in some instances, including when a reflective metal lattice 605 is within their fields of view, the structured light cameras 218, 228 may not detect a shopping cart and/or other object and/or obstacle. As such, the one or more ultrasound arrays 220 are used at least as a secondary level of obstacle detection.

Figure 7:
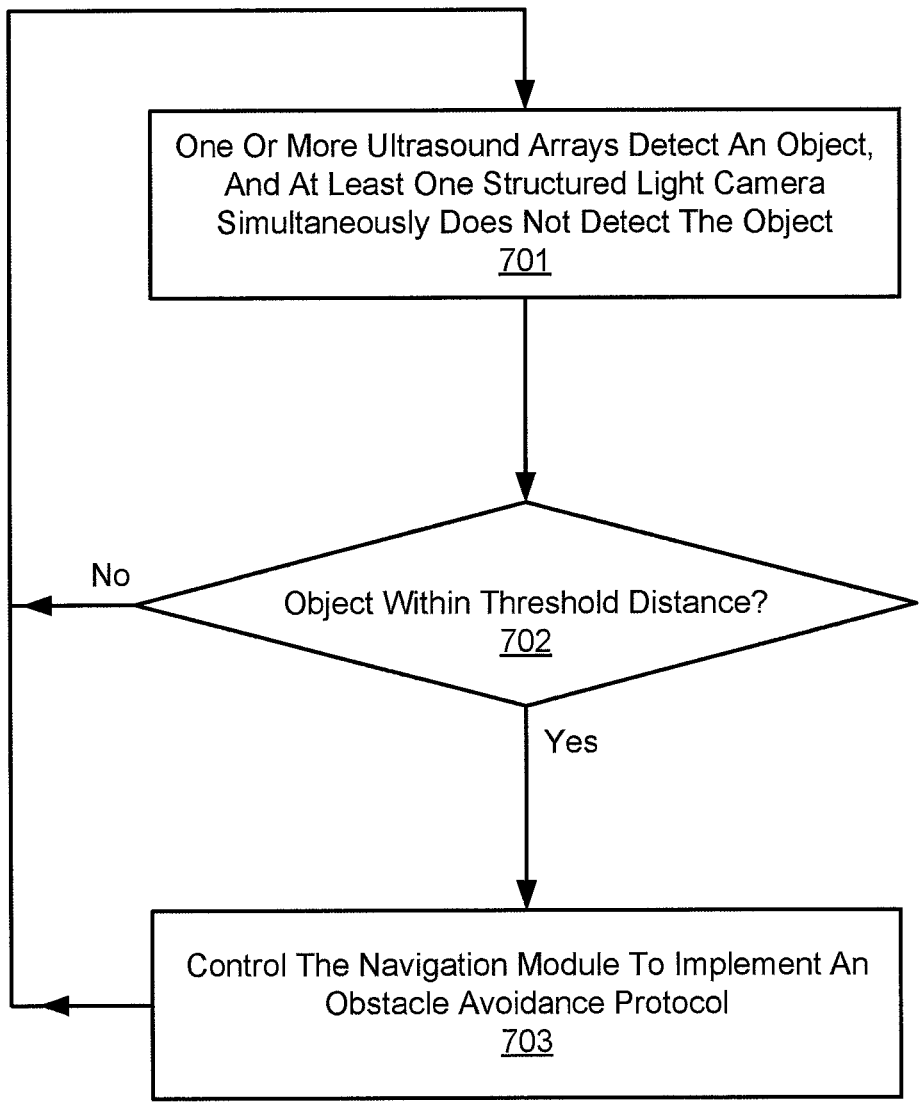
FIG. 7 is a flowchart of a method of obstacle detection for a mobile automation apparatus in accordance with some embodiments.

Hence, attention is now directed to FIG. 7 which depicts a flowchart representative of an example method 700 for avoidance of obstacles having reflective and/or discontinuous (e.g., meshed or lattice-like) surfaces. The example operations of the method 700 of FIG. 7 correspond to machine readable instructions that are executed by, for example, the apparatus 103, and specifically by the controller 320 and/or the various components of the control application 328 including, but not limited to, the obstacle avoider 401. Indeed, the example method 700 of FIG. 7 is one way in which the apparatus 103 is configured. However, the following discussion of the example method 700 of FIG. 7 will lead to a further understanding of the apparatus 103, and its various components. However, it is to be understood that in other embodiments, the apparatus 103 and/or the method 700 are varied, and hence need not work exactly as discussed herein in conjunction with each other, and that such variations are within the scope of present embodiments.

Furthermore, the example method 700 of FIG. 7 need not be performed in the exact sequence as shown and likewise, in other embodiments, various blocks may be performed in parallel rather than in sequence. Accordingly, the elements of method 700 are referred to herein as "blocks" rather than "steps." The example method 700 of FIG. 7 may be implemented on variations of the example apparatus 103, as well.

At block 701, the controller 320 determines when the one or more ultrasound arrays 220 detect a reflective object and/or an object having discontinuous planar surfaces (e.g., a reflective metal lattice 605 of the cart 603), and the structured light cameras 218, 228 simultaneously do not detect the object. For example, the block 701 occurs using the obstacle detector 410 in conjunction with one or more sets of camera data 418, 428 from at least one of the structured light cameras 218, 228.

At the block 702, the controller 320 determines whether the reflective object is within a threshold distance using, for example, the distance determiner 411 in conjunction with one or more sets of the ultrasound data 420 and/or the LIDAR data 421 (e.g. presuming that the one or more sets of camera data 418, 428 indicate that the object is not detected). In some embodiments, the threshold distance is set to a minimum distance at which the apparatus 103 is navigable around the object.

Furthermore, the block 702 is, in some embodiments, optional, and whether or not the block 702 is implemented is configurable at the apparatus 103.

When the object is not within the threshold distance (e.g. a "No" decision at the block 702), the block 701 repeats whenever an object is detected by the one or more ultrasound arrays 220. In particular, at the block 701, a determination of whether an object and the like is detected occurs periodically (for example, about every 100 ms) and, in some of these embodiments, a local "map" around the apparatus 103 is determined based on data from the structured light cameras 218, 228, the lidar device 221, the ultrasound arrays 220 and/or any other sensors used for detecting obstacles. The local "map" generally represents an obstacle landscape around the apparatus 103. In some of these embodiments, each cell of an occupancy grid (e.g. with cells of about 5 cm×5 cm) of the local map is reviewed by the controller 320 to determine whether or not an obstacle is present in each cell, according to the data received from the from the structured light cameras 218, 228, the lidar device 221, the ultrasound arrays 220. In these embodiments, the data from the ultrasound arrays 220 indicate an obstacle in a given cell, while the data from one or more of the structured light cameras 218, 228 indicate that there is no obstacle in the same given cell. However, other techniques for determining whether obstacles are detected by one or more of the ultrasound arrays 220, but not by at least one of the structured light cameras 218, 228 are within the scope of present embodiments.

However, when the object is within the threshold distance (e.g. a "Yes" decision at the block 702), at the block 703, the controller 320 controls the navigation module 340 to implement the obstacle avoidance protocol 412 as described above with respect to the block 503 of the method 500. Indeed, put another way, the ultrasound arrays 220 are used to detect a false negative of the structured light cameras 218, 228 including, but not limited to, a false negative when detecting a shopping cart, or any other object having reflective and/or discontinuous surfaces (e.g., mesh surfaces) within a field of view of the structured light cameras 218, 228.

In some embodiments, when the structured light cameras 218, 228 provide an indication that an object is detected, corresponding data from the one or more ultrasound arrays 220 is ignored and/or not used. Indeed, as the ultrasounds arrays 220 generally provide a lower resolution of detection than the structured light cameras 218, 228 (e.g. ultrasound images are generally lower resolution than structured light camera images), in some embodiments, the controller 320 ignores ultrasound data when the structured light cameras 218, 228 detect an obstacle (e.g., to reduce use of processing resources and/or reduce processing overhead in obstacle detection).

In some embodiments, the control of the navigation module 340 further depends on the distance to the object. For example, when the object is within a first threshold distance, where the apparatus 103 is not navigable around the object and/or where a collision with the object may occur, the navigation module 340 is controlled to stop and/or slow down the apparatus 103. Similarly, when the object is within a second threshold distance, greater than the first threshold distance, where the apparatus 103 is navigable around the object, the navigation module 340 is controlled to navigate the apparatus 103 around the object. When the embodiment of block 703 causes the apparatus 103 to stop and/or slow down, once the object is at least at the second threshold distance (presuming the object is moving), the navigation module 340 is controlled to navigate the apparatus 103 around the object.

However, if the distance to the object does not change, and the apparatus 103 is stopped, in some embodiments the controller 320 controls the interface 324 to transmit a notification to the server 101 that the apparatus 103 has stopped. In an embodiment, the notification includes a location of the apparatus 103. Upon receipt of the notification, the server 101 transmits a notice to the mobile device 105 that the apparatus 103 is stopped and may also notify the mobile device 105 of the location of the apparatus 103; this can cause a user of the mobile device 105 to investigate why the apparatus 103 has stopped.

Alternatively, if the distance to the object does not change, and the apparatus 103 is stopped, after a given time period, the navigation module 340 is controlled to navigate the apparatus 103 to a position, relative to the object, where the object is at least at the second threshold distance (for example by moving the apparatus 103 in an opposite direction to a movement direction where the object was detected), and the apparatus 103 navigates around the object.

The method 700 repeats each time the controller 320 determines that the one or more ultrasound arrays 220 detects an object, and the structured light cameras 218, 228 simultaneously do not detect the object. Hence, the method 700 generally runs in parallel with other methods at the apparatus 103, including, for example other data detection methods (e.g. for detecting prices, barcodes, and the like) and/or navigation methods.

Indeed, the method 700 is generally executed in parallel with the method 500 and, in some embodiments, the method 500 is modified to include aspects of the method 700. For example, in some embodiments, the method 500 is modified such that when the one or more ultrasound arrays 220 detects an object, for example the shopping cart 603, and the structured light camera 218 simultaneously does not detect the object, for example the shopping cart 603, the navigation module 340 is controlled to implement the obstacle avoidance protocol 412 and/the navigation module 340 is controlled to implement the obstacle avoidance protocol only when the object is within a threshold distance as described above.

Figure 8:
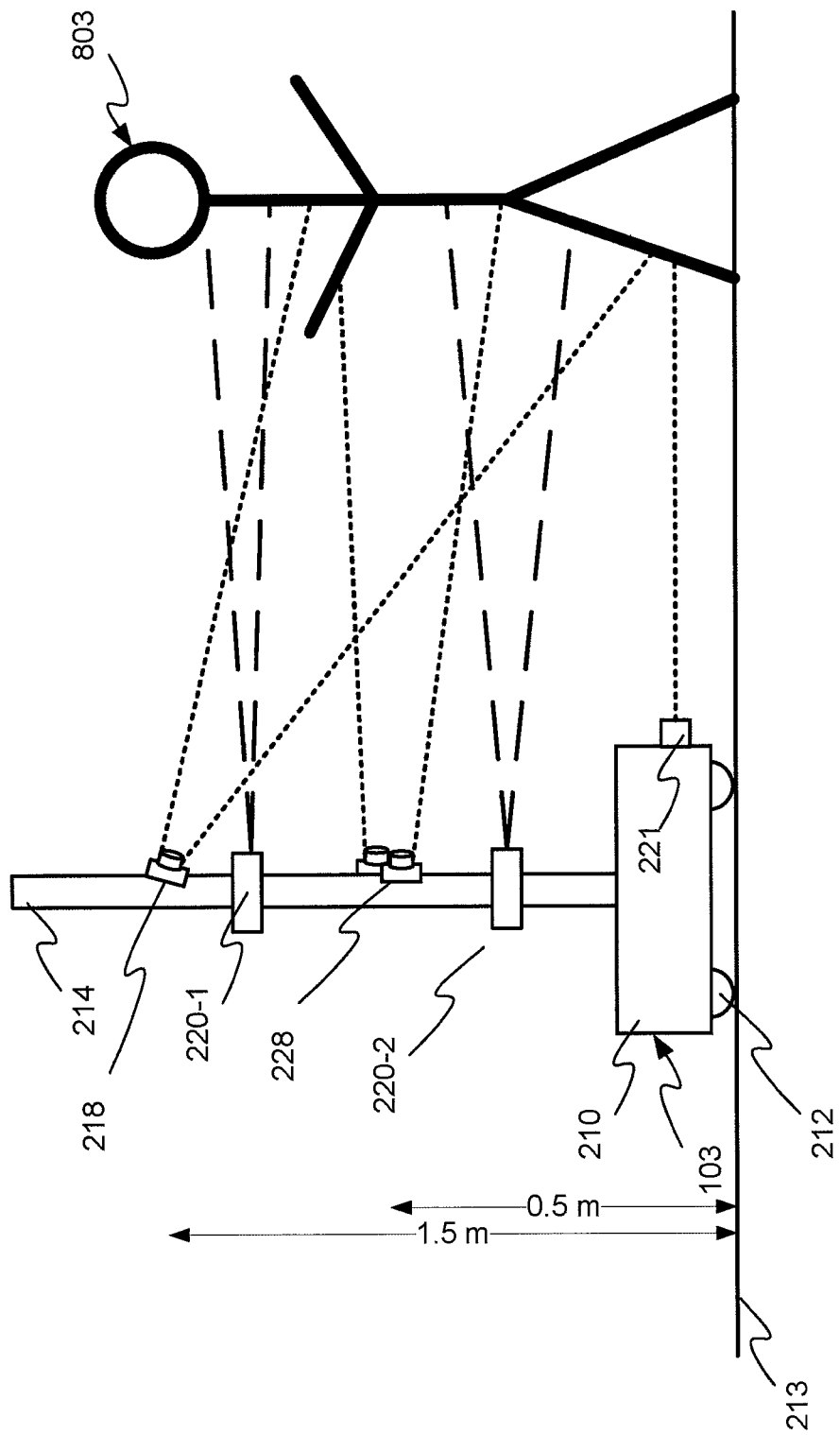
FIG. 8 is a side view of the mobile automation apparatus of FIG. 2 detecting an object in accordance with some embodiments.

The method 700 is now described with reference to FIG. 8, which is substantially similar to FIG. 6, with like elements having like numbers, but includes an object 803. For example, as depicted, the object 803 includes a person; however, the object 803 may also include a shopping cart and/or a person pushing a shopping cart, and/or any other obstacle that the apparatus 103 may encounter in an environment in which the apparatus 103 is navigating. The object 803 is at a distance from the apparatus 103 where the object 803 is not detectable by the structured light cameras 218, 228, but is generally detectable by one or more of the ultrasound arrays 220. The field of view of each of the ultrasound arrays 220 is indicated by broken lines (for clarity, different from the broken lines of the fields of view of the structured light cameras 218, 228 and the LIDAR device 221).

As the structured light cameras 218, 228 do not detect the object 803, but one or more of the ultrasound arrays 220 do detect the object 803, the obstacle avoidance protocol 412 is implemented, as described above. For example, attention is directed to FIG. 9 which schematically depicts a top view of the apparatus 103 and the object 803, as well as a path 901, 903 of the apparatus 103. Specifically, the path 901 represents the path of the apparatus 103 to a location where the object 803 is detected, and the path 903 represents the path of the apparatus 103 from the location where the object 803 is detected when the obstacle avoidance protocol 412 is implemented to navigate around the object 803. In particular, the apparatus 103 is navigated to a path 903 parallel to path 901, until the apparatus 103 is past the object 803, where the apparatus 103 is navigated back to a path coincident with the path 901. Put another way, the navigation module 340 is controlled to alter the navigation of the mobile automation apparatus 103 based on a comparison between ultrasound sensor data (e.g. from an ultrasound sensor 220) to structured light data (e.g. from one or more of the structured light cameras 218, 228). In some embodiments, the apparatus further transmits a notification of the alteration of the path (e.g. from the path 901 to the path 903) to the server 101, which may include a location of the apparatus 103.

In yet further embodiments, the controller 320 can be configured to recognize obstacle types; for example, when the object 803 comprises a shopping cart, a person, a display, and/or any object having a particular physical configuration that can be determined from data from the one or more of the ultrasound arrays 220 and/or the lidar device 221, the obstacle avoidance protocol can be object specific. For example, when the object 803 includes a person, the apparatus 103 can stop; however, when the object 803 includes a shopping cart (e.g. without a person), display, a pallet, and the like, the apparatus 803 can go around the object 803.

In the foregoing specification, specific embodiments have been described. However, one of ordinary skill in the art appreciates that various modifications and changes can be made without departing from the scope of the invention.

For example, the method 700 is modified, in some embodiments, to control the navigation module 340 to implement the obstacle avoidance protocol 412 when one or more of the structured light cameras 218, 228 and/or the LIDAR device 221 detect an object regardless of whether the one or more ultrasound arrays 220 detect the object. In other words, in some embodiments, the navigation module 340 to implement the obstacle avoidance protocol 412 whenever one or more of the structured light cameras 218, 228, the ultrasound arrays and the LIDAR device 221 detects an object, regardless of whether the other sensors detect an object.

For example, while each of the structured light cameras 218, 228 are described as facing in a forward direction (e.g. in a direction of movement of the apparatus 103), in another example, one or more of the structured light cameras 218, 228 are pointed in other directions, and/or the apparatus 103 further comprises other structured light cameras facing in other directions.

Furthermore, the fields of view of the structured light cameras 218, 228 are arranged, in some embodiments, such that a field of view of the structured light camera 218 is in a dead zone of the fields of view of the structured light cameras 228. For example, attention is next directed to FIG. 10 which schematically depicts the two structured light cameras 228 at the mast 214 (depicted in cross-section), as well as respective fields of views of the two structured light cameras 228 as broken lines extending therefrom. As the two structured light cameras 228 are pointing in different directions, their field of view do not overlap and indeed, there is a dead zone 1001 therebetween where objects are not imaged by the two structured light cameras 228. For example, the dead zone 1001 is, in some embodiments, in a direction of movement of the apparatus 103. However, the field of view 1003 of the structured light camera 218 (not depicted, but assumed to be oriented relative to the two structured light camera 228 as depicted in FIG. 2) is oriented in the dead zone 1001 of the two structured light cameras 228 such that objects not imaged by the two structured light cameras 228 are imaged by the structured light camera 218.

Indeed, such an arrangement can ensure that objects in a region adjacent to the apparatus 103 are detectable by the structured light camera 218, and that objects on either side of this region are detectable by the structured light cameras 228, Indeed, the relative orientations of the structured light cameras 218, 228, as well as the orientations of one or more LIDAR devices and/or depth sensing devices, and/or ultrasound arrays, are generally selected to increase a range over which objects around the apparatus 103 are detectable.

Furthermore, as the structured light camera 218 is pointed towards the floor 213, the structured light camera 218 further detects objects that are above or below the fields of view of each of the LIDAR device 221, the ultrasound arrays 220, and the structured light camera 228.

Indeed, as the apparatus 103 is, in some embodiments, configured to navigate in many directions, the sensors at the apparatus 103 are generally arranged to sense objects over the directions in which the apparatus 103 is configured to navigate.

For example, in some embodiments, the apparatus 103 is configured to move only longitudinally (e.g. forward and backward, as well as steering and/or turning in each of these directions) but not sideways (e.g. non-holonomic). In these embodiments, the sensors at the apparatus 103 are generally arranged to cover a range around the apparatus 103 over which the apparatus 103 is configured to move.

For example, the sensors described herein do not necessarily detect an entirety of an object and/or an obstacle, but rather the sensors are arranged to detect a portion and/or a region of the obstacle in order to infer structure sufficient to implement the obstacle avoidance protocol. Indeed, the sensors described herein are generally low cost readily available sensors, which are arranged to work together so that forward facing regions (e.g. in a movement direction) are generally covered by the sensors. For example, if LIDAR does not detect any part of an obstacle, then a structured light camera may detect part of the obstacle; however, if the structured light camera does not detect part of the obstacle, then the ultrasound arrays should detect at least a part of the obstacle. In other words, as the apparatus 103 is provisioned with three types of sensors for obstacle detection, the obstacle avoider 401 includes primary, secondary, and tertiary levels of obstacle detection.

The LIDAR devices described herein may have difficulties detecting light absorbing (black/dark) materials or highly reflective materials. Furthermore, the LIDAR devices described herein may be 2D (two-dimensional) planar sensors, which hence detect obstacles over a slice of the environment in which the apparatus 103 is navigating, and at ankle level.

Structured light cameras described herein may have difficulties detecting light absorbing (black/dark) materials or highly reflective materials. However, structured light cameras can otherwise detect a large percentage of the obstacles found in the retail environment. Ultrasound arrays and/or sensors may have issues detecting obstacles with high resolution since the sound waves are directed over a wide angle. However, ultrasound arrays and/or sensors very accurately detect highly reflective materials or very small objects.

Hence, in the apparatus described herein, a LIDAR device mounted at a front of the apparatus at ankle height is used to detect a large majority of the obstacles found at ankle height. Any obstacle found above or below ankle height is to be detected using a different sensor modality. Multiple structured light cameras (e.g. structured light cameras 228) are used to detect shoppers, aisle shelves, doors, baskets, shopping carts, items protruding from shelf, and any obstacle that is more than 1 m away from the apparatus 103 (and/or outside of a field of view of the structured light camera 218) and is in the range of the structured light cameras 228. However, in order to detect a shopping cart, the structured light camera 218 is placed at a height of about 1.5 m angled downwards at about 45 degrees, which allows for detecting a plastic protector ring on the top of a shopping cart. From the camera data captured by the structured light camera 228, at least the plastic protector ring of the shopping cart is detectable which allows the shopping cart to be avoided by the apparatus 103, as per the method 500.

However, as a failsafe, as per the method 700, the one or more ultrasound arrays 220 are used to detect obstacles within close proximity to the apparatus 103, for example, which, when detected, can cause the apparatus to stop and/or slow down (and/or prepare to stop and/or slow down), for example, when the obstacle is about 1 m from the apparatus 103. Indeed, the ultrasound sensors of the one or more ultrasound arrays 220 are, in some embodiments, positioned to form a phased ultrasound array which can detect shiny reflective obstacles such as reflective shopping cart meshes and/or lattices, within 1 m from the apparatus 103. Indeed, phased ultrasound array can further increase the obstacle detection resolution.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less all features of a single disclosed embodiment. Thus, the following claims are hereby incorporated into the Detailed Description, with each claim standing on its own as a separately claimed subject matter.

We claim:
1. A mobile automation apparatus comprising:
a mast extending in an upward direction;
a navigation module configured to move the mobile automation apparatus in an environment;
a structured light camera positioned on the mast, the structured light camera configured to detect an object in a vicinity of the mobile automation apparatus;
one or more ultrasound arrays on the mast, each of the one or more ultrasound arrays configured to detect the object-in the vicinity; and
a controller configured to:
when the structured light camera detects the object, ignore ultrasound data from the one or more ultrasound arrays and select structured light data from the structured light camera as an input to an obstacle avoidance protocol;-
when the one or more ultrasound arrays detect the object and the structured light camera simultaneously does not detect the object in a same cell of an occupancy grid in the vicinity, select the ultrasound data from the one or more ultrasound arrays as the input to an obstacle avoidance protocol;
determine an obstacle type of the object; and
implement the obstacle avoidance protocol based on the selected input and the obstacle type.

2. The mobile automation apparatus of claim 1, wherein the object includes a reflective surface.

3. The mobile automation apparatus of claim 2, wherein the surface is discontinuous.

4. The mobile automation apparatus of claim 3, wherein the surface is a mesh surface of a shopping cart.

5. The mobile automation apparatus of claim 1, further comprising a base, the mast extending in the upward direction from the base; and one or more of a depth sensing device and a LIDAR device located at the base, and configured to sense depth at an ankle height.

6. The mobile automation apparatus of claim 1, further comprising one or more second structured light cameras between a base of the mast and the structured light camera, the one or more second structured light cameras configured to detect objects over respective angles on either side of the vicinity.

7. The mobile automation apparatus of claim 1, wherein the navigation module is configured to move the mobile automation apparatus in the environment in a forward direction, and the structured light camera is further configured to detect at least the object in the region in the forward direction.

8. The mobile automation apparatus of claim 1, further comprising a communication interface configured to transmit a notification of an alteration of a navigation of the mobile automation apparatus to a mobile device.

9. The mobile automation apparatus of claim 8, wherein the notification includes a location of the mobile automation apparatus.

10. The mobile automation apparatus of claim 1, wherein the controller is configured to implement the obstacle avoidance protocol when the object is within a threshold distance from the mobile automation apparatus.

11. A method of obstacle avoidance by a mobile automation apparatus, the method comprising:

detecting, by an ultrasound sensor of the mobile automation apparatus, ultrasound data representing a vicinity of the mobile automation apparatus;

detecting, by a structured light camera of the mobile automation apparatus, structured light data representing the vicinity of the mobile automation apparatus;

when the structured light data indicates an object is detected in the vicinity of the mobile automation apparatus, ignoring the ultrasound data and selecting the structured light data as an input to an obstacle avoidance protocol; and when the ultrasound data indicates an object is detected in a cell of an occupancy grid in the vicinity of the mobile automation apparatus when the structured light data simultaneously does not indicate the object is detected in the same cell of the occupancy grid:

determining whether the object is within a threshold distance from the mobile automation apparatus; and when the object is within the threshold distance, selecting the ultrasound data as the input to the obstacle avoidance protocol;

determining an obstacle type of the object; and implementing the obstacle avoidance protocol based on the selected input and the obstacle type.

12. The method of claim 11, wherein the object includes a reflective surface.

13. The method of claim 12, wherein the surface is discontinuous.

14. The method of claim 13, wherein the surface is a mesh surface.

15. The method of claim 14, wherein the mesh surface is a surface of a shopping cart.

16. The method of claim 11, further comprising transmitting a notification of an alteration of a navigation of the mobile automation apparatus to a mobile device.

17. The method of claim 16, wherein the notification includes a location of the mobile automation apparatus.

18. A non-transitory computer readable medium having stored thereon computer executable instructions for obstacle avoidance by a mobile automation apparatus, the instructions to configure a controller of the mobile automation apparatus to:

detect, by an ultrasound sensor of the mobile automation apparatus, ultrasound data representing a vicinity of the mobile automation apparatus;

detect, by a structured light camera of the mobile automation apparatus, structured light data representing the vicinity of the mobile automation apparatus;

when the structured light camera detects the object, ignore ultrasound data from the ultrasound sensor and select structured light data from the structured light camera as an input to an obstacle avoidance protocol;

when the ultrasound sensor detects the object and the structured light camera simultaneously does not detect the object in a same cell of an occupancy grid in the vicinity, select the ultrasound data from the ultrasound sensor as the input to an obstacle avoidance protocol;

determine an obstacle type of the object; and implement the obstacle avoidance protocol based on the selected input and the obstacle type.

19. The computer readable medium of claim 18, wherein the object includes a reflective surface.

20. The computer readable medium of claim 19, wherein the reflective surface is a mesh surface of a shopping cart.

* * * * *